(12) United States Patent
Powell

(10) Patent No.: US 9,221,144 B2
(45) Date of Patent: Dec. 29, 2015

(54) UNIVERSAL SHARPENING JIG FOR A CUTTING BLADE

(71) Applicant: David G. Powell, Wellesley, MA (US)

(72) Inventor: David G. Powell, Wellesley, MA (US)

( * ) Notice: Subject to any disclaimer, the term of this patent is extended or adjusted under 35 U.S.C. 154(b) by 255 days.

(21) Appl. No.: 14/138,292

(22) Filed: Dec. 23, 2013

(65) Prior Publication Data
US 2015/0174723 A1    Jun. 25, 2015

(51) Int. Cl.
| | |
|---|---|
| *B24B 3/38* | (2006.01) |
| *B24B 41/06* | (2012.01) |
| *B24D 15/06* | (2006.01) |
| *B23Q 16/08* | (2006.01) |
| *B24B 9/04* | (2006.01) |

(52) U.S. Cl.
CPC . *B24B 9/04* (2013.01); *B23Q 16/08* (2013.01); *B24B 3/38* (2013.01); *B24D 15/06* (2013.01)

(58) Field of Classification Search
CPC .............. B24B 3/00; B24B 3/38; B24B 3/54; B24B 3/60; B24B 41/00; B24B 41/06; B24B 41/066; B24D 15/06; B23Q 16/02; B23Q 16/08; B23Q 3/06
USPC ................. 451/367, 371, 378, 403, 404, 405; 76/81, 82; 269/19, 56, 57, 58, 59, 75
See application file for complete search history.

(56) References Cited

U.S. PATENT DOCUMENTS

| | | | | |
|---|---|---|---|---|
| 471,679 | A | | 3/1892 | Spruce |
| 1,628,754 | A | | 5/1927 | Strand |
| 2,131,626 | A | * | 9/1938 | Keith ..................... B24D 15/06 451/321 |
| 2,353,096 | A | | 7/1944 | Weidauer |
| 2,435,671 | A | * | 2/1948 | Clark ..................... B24D 15/08 451/321 |
| 2,644,279 | A | * | 7/1953 | Stankovich ........... B24B 41/066 451/320 |
| 2,885,911 | A | * | 5/1959 | Minici .................. B23D 63/105 76/31 |
| 2,902,801 | A | | 9/1959 | Callaghan |
| 4,217,735 | A | | 8/1980 | McGeoch et al. |
| 4,471,673 | A | * | 9/1984 | Rosenquist ............ B23D 63/14 76/41 |
| 4,532,736 | A | * | 8/1985 | Shinneman, Jr. ..... B24B 41/066 269/243 |
| 4,733,501 | A | | 3/1988 | McLean |

(Continued)

FOREIGN PATENT DOCUMENTS

| | | |
|---|---|---|
| EP | 825036 | 12/1959 |
| EP | 2405608 A | 9/2005 |
| WO | WO9956915 A1 | 11/1999 |

*Primary Examiner* — Eileen Morgan
(74) *Attorney, Agent, or Firm* — Landiorio Teska & Coleman, LLP

(57) ABSTRACT

A universal sharpening jig for a cutting blade includes a base plate, a protractor plate coupled to the base plate, an incline plate hingedly coupled to the base plate and slideably connected to the protractor plate, the incline plate configured to secure the cutting blade and configured to set and fix the angle of the incline plate with respect to the base plate to define a sharpening angle of all or a portion of a bevel with respect to a flat back of the cutting blade. A push plate is slideably attached proximate a front of the base plate and co-planar with a bottom surface of the base plate, the push plate configured to position a user-applied force vector thereon and directly apply the force vector closely proximate the intersection of the bevel and an abrasive surface to reduce de-stabilizing moments and user energy need to create a sharpened edge between the bevel and the flat back of the cutting blade. At least one glide located proximate back of the base plate is configured to longitudinally and/or laterally level the base plate with respect to a level abrasive surface to allow movement of the jig in all horizontal directions by a user to create the sharpened edge on the cutting blade.

35 Claims, 35 Drawing Sheets

(56) References Cited

U.S. PATENT DOCUMENTS

| | | | | |
|---|---|---|---|---|
| 5,195,275 A * | 3/1993 | McLean | | B24D 15/06 269/160 |
| 5,431,068 A * | 7/1995 | Alsch | | B24D 15/08 269/3 |
| 5,582,542 A | 12/1996 | Stein | | |
| 5,944,592 A | 8/1999 | Hall et al. | | |
| 6,030,281 A | 2/2000 | Cozzini et al. | | |
| 7,387,562 B1 * | 6/2008 | Blum | | B24D 15/08 451/380 |
| 7,549,910 B2 | 6/2009 | Stanley | | |
| 7,553,216 B2 | 6/2009 | Hyde et al. | | |
| 8,197,304 B2 * | 6/2012 | Hummel | | B24B 3/34 451/380 |
| 2006/0057946 A1 * | 3/2006 | Evans | | B24D 15/06 451/45 |
| 2007/0026771 A1 * | 2/2007 | Harden | | B24B 3/58 451/45 |
| 2009/0004956 A1 * | 1/2009 | Smith | | B24B 3/38 451/371 |
| 2009/0318066 A1 | 12/2009 | Clay | | |
| 2014/0342644 A1 * | 11/2014 | Hasegawa | | B24B 41/066 451/369 |

\* cited by examiner

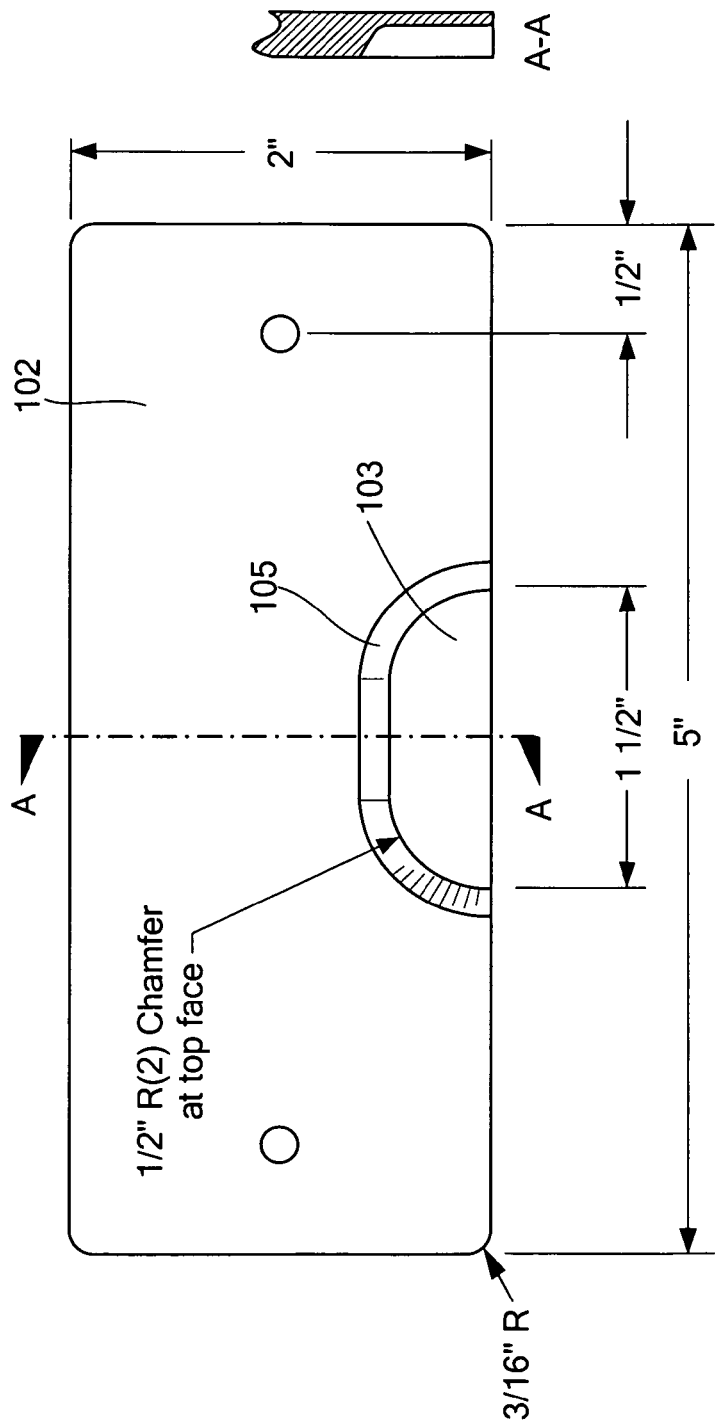
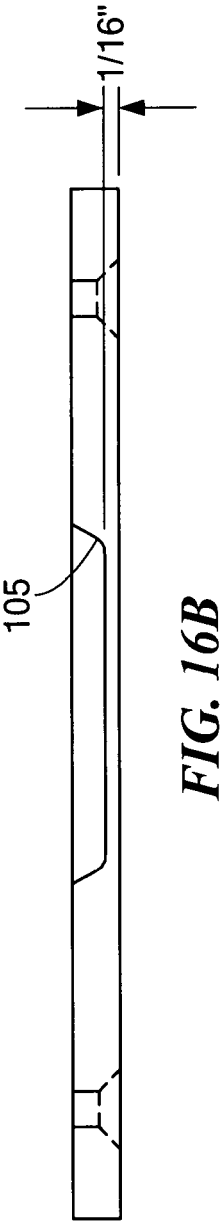
FIG. 16A
FIG. 16B

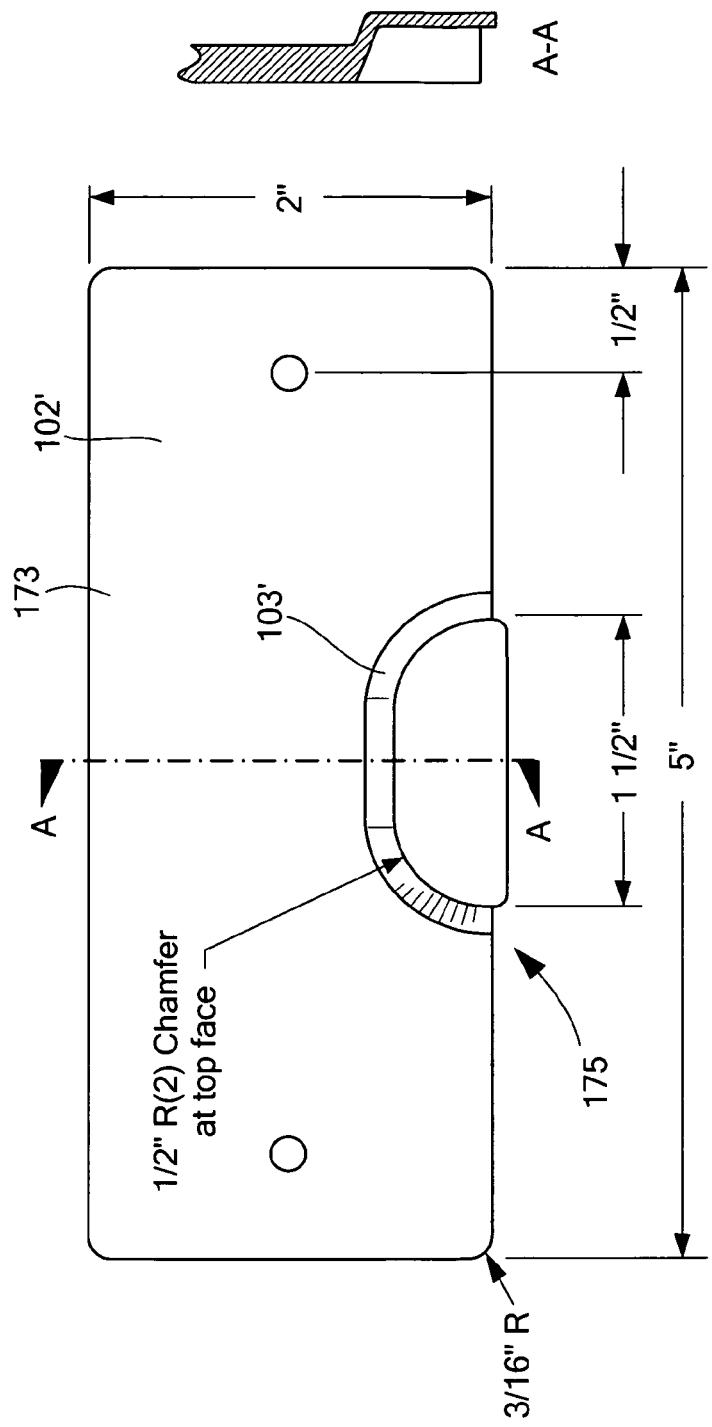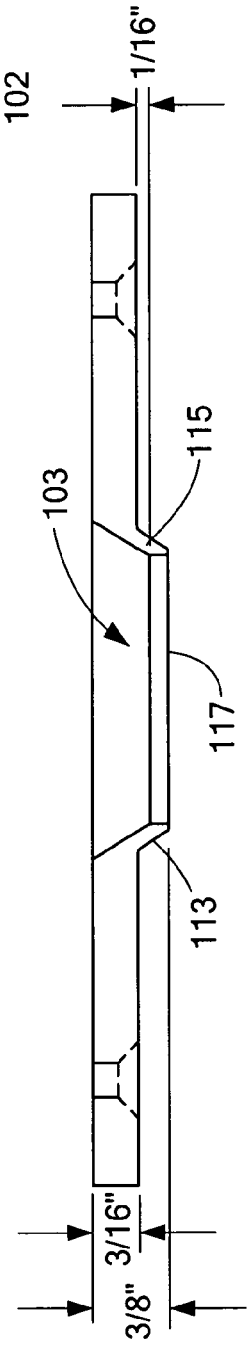
FIG. 17A
FIG. 17B

UNIVERSAL SHARPENING JIG FOR A CUTTING BLADE

FIELD OF THE INVENTION

This invention relates to a universal sharpening jig for a cutting blade.

BACKGROUND OF THE INVENTION

Conventional sharpening jigs used to sharpen cutting blades, such as a hand plane iron, a skew iron, a chisel, a scraper iron, a skew chisel, or similar type device, typically rely on some type of clamping device to secure the cutting blade to the jig and wheels which move the cutting blade along an abrasive surface, e.g., a grit surface of a sharpening stone, abrasive sandpaper, a diamond plate, and the like. Some conventional sharpening jigs rely on a user to set the desired angle of the iron with a ruler to indirectly determine the approximate angle by extension in a calibration scale. Then, the user strokes the sharpening jig and blade in a fore-and-aft direction on the abrasive surface. However, such a design may result in wear to the wheels, cause grit from the abrasive surface to damage the bearings of the wheels, and any skids from the wheels may cause grooves or ruts on the abrasive surface which may require dressing work to re-true the flatness of abrasive surface. Such conventional sharpening jigs also limit the available abrasive surface area that could be utilized by the sharpening jig because the jig is located on the abrasive surface. Additionally, a very strong hand grip is required to hold the loaded jig and apply controlled stroke forces at increasingly higher angles, often referred to as "white knuckle" gripping.

Other conventional sharpening jigs may utilize an integrated clamping structure that similarly includes wheels or some type of pivot mechanism which allows the user to set the sharpening angle of the blade secured in a clamp. However, such a design has a limited accuracy due to the small protracted design. These devices also suffer from "white knuckle" gripping.

Another conventional sharpening jig includes a pivot design with a small limited incremental scale for setting stone abrasive surface height above the bench and rear wheels which do not contact the abrasive surface. However, this jig yields only a singular, e.g., 30°, sharpening angle of the cutting blade.

Moreover, conventional sharpening jigs typically limit the sharpening stroke to the wheel direction and therefore only a singular orientation of edge to stroke, namely, with the sharpening edge perpendicular to stroke.

SUMMARY OF THE INVENTION

In one aspect, a universal sharpening jig for a cutting blade is featured. The universal sharpening jig includes a base plate, a protractor plate coupled to the base plate, an incline plate hingedly coupled to the base plate and slideably connected to the protractor plate. The incline plate is configured to secure the cutting blade and configured to set and fix the angle of the incline plate with respect to the base plate to define a sharpening angle of all or a portion of a bevel with respect to a flat back of the cutting blade. A push plate is slideably attached proximate a front of the base plate and co-planar with a bottom surface of the base plate, the push plate configured to position a user-applied force vector thereon and directly apply the force vector closely proximate the intersection of the bevel and an abrasive surface to reduce de-stabilizing moments and user energy need to create a sharpened edge between the bevel and the flat back of the cutting blade. At least one glide is located proximate back of the base plate is configured to longitudinally and/or laterally level the base plate with respect to a level abrasive surface to allow movement of the jig in all horizontal directions by a user to create the sharpened edge on the cutting blade.

In one embodiment, the cutting blade may include one or more of: a hand plane iron, a skew plane iron, a chisel, a skew chisel, and a scraper plane iron. The clamping device may be configured to secure the cutting blade having an edge tool width in the range of about one-quarter inch to about three inches. The incline plate may further include a clamping device configured to secure the cutting blade to the incline plate. The universal sharpening jig may further include a bridge clamp privotably attached to the base plate configured to further secure the cutting blade in place. The clamping device may include a securing plate attached to the incline plate configured to secure the cutting blade to the incline plate and provide for longitudinally adjusting the position of the cutting blade with respect to the abrasive surface. The clamping device may include two slideable cooperating members pivotably attached to the incline plate configured to define an adjustable opening for receiving a blade of the skew chisel and configured to set the angle of the blade of the skew chisel such that the cutting edge of the blade is perpendicular to the sides of the base plate. The universal sharpening jig may further include a bridge clamp pivotably attached to the base plate configured to further secure the blade of the skew chisel in place. The clamping device may include a recess plate having one or more channels therein configured to receive a blade of a skew chisel. The one or more channels may each be configured at a predetermined angle such that a cutting surface of the blade of the skew chisel is perpendicular to sides of the base plate. The universal sharpening jig may further include a bridge clamp privotably attached to the base plate configured to further secure the cutting blade in place. The clamping device may be configured to secure the bevel of the cutting blade in a bevel down configuration. The incline plate and the protractor plate may be configured to create a bevel having an angle in the range of about 5° to about 60° with respect to the flat back. The incline plate and the protractor plate may be configured to directly set and fix the sharpening angle to create a hone bevel on the cutting blade. The incline plate and the protractor plate may be configured to directly set and fix the sharpening of the angle to create a micro bevel on the cutting blade. The incline plate and the protractor plate may be configured to directly set and fix the sharpening of the angle to create a back bevel on the cutting blade. The incline plate and the protractor plate may be configured to compensate for a tapered cutting blade. The at least one glide may include a plurality of glides configured to increase sharpening control. The plurality of glides may be spaced a width greater than the width of the cutting blade to provide increased sharpening control. The at least one glide may include a rounded surface. The push plate may include one or more recesses configured to position the user-applied force vector more closely proximate the intersection of the bevel and the abrasive surface to further reduce the destabilizing moments and user energy needed to create the sharpened edge. The push plate may be positioned proximate the cutting blade to further secure the cutting blade to the incline plate. The push plate may be made of a transparent material for viewing one or more of swarf, the cutting blade, the abrasive surface, and the sharpened edge. The push plate may include a stepped plate configured to provide for sharpening a back bevel. The at least one glide may provide for stroking the jig over the abrasive surface in all horizontal directions. The at least one glide may provide for stroking the jig over the abrasive surface in the jig longitudinally fore-and-aft. The glide may provide for side-stroking the jig over the abrasive surface. The sharpening jig may be configured to provide for side-stroking the jig over the abrasive surface to create a crowned bevel. The at least one glide may be configured to provide for stroking the jig with a skew stroke over a full width abrasive surface. The at least one glide may be configured to provide for stroking the jig with a skew stroke over a half width abrasive surface. The at least one glide may be configured to provide for stroking the jig over the abrasive surface in a figure eight lapping pattern. The at least one glide may be configured to enable the jig to use the entire surface area of the abrasive surface. The at least one glide may be configured to provide for side-stroking the jig over a full width abrasive surface. The at least one glide may be configured to provide for side-stroking the jig over a half width abrasive surface.

In another aspect, a universal sharpening jig for a cutting blade is featured. The universal sharpening jig includes a base plate, a protractor plate coupled to the base plate, an incline plate hingedly coupled to the base plate and slideably connected to the protractor plate. The incline plate is configured to secure the cutting blade and configured to set and fix the angle of the incline plate with respect to the base plate to define a sharpening angle of all or a portion of a bevel with respect to a flat back of the cutting blade. An all azimuth spirit level in the base plate is configured to determine if the base plate is longitudinally and laterally level with respect to a leveled abrasive surface located on a level work surface. A push plate slideably attached proximate a front of the base plate and co-planar with a bottom surface of the base plate is configured to position a user-applied force vector thereon and directly apply the force vector above and closely proximate the intersection of the bevel and an abrasive surface to reduce de-stabilizing moments and user energy needed to create the sharpened edge on the cutting blade. At least one glide located proximate back of the base plate and in contact with a work surface of a bench is configured to longitudinally and/or laterally level the base plate with respect to the abrasive surface to allow movement of the jig in all horizontal directions by a user to create the sharpened edge on the cutting blade.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 16A is a schematic top-view showing in further detail the structure of the slideable push plate shown in FIGS. 14-15;

FIG. 16B is a schematic end-view showing in further detail the structure of the slideable push plate shown in FIGS. 14-15;

FIG. 17A is a schematic top-view showing another embodiment of the push plate of the universal sharpening jig shown in one or more of FIGS. 7-12;

FIG. 17B is a schematic end-view of the push plate shown in FIG. 17A;

DETAILED DESCRIPTION OF THE INVENTION

Figure 1:
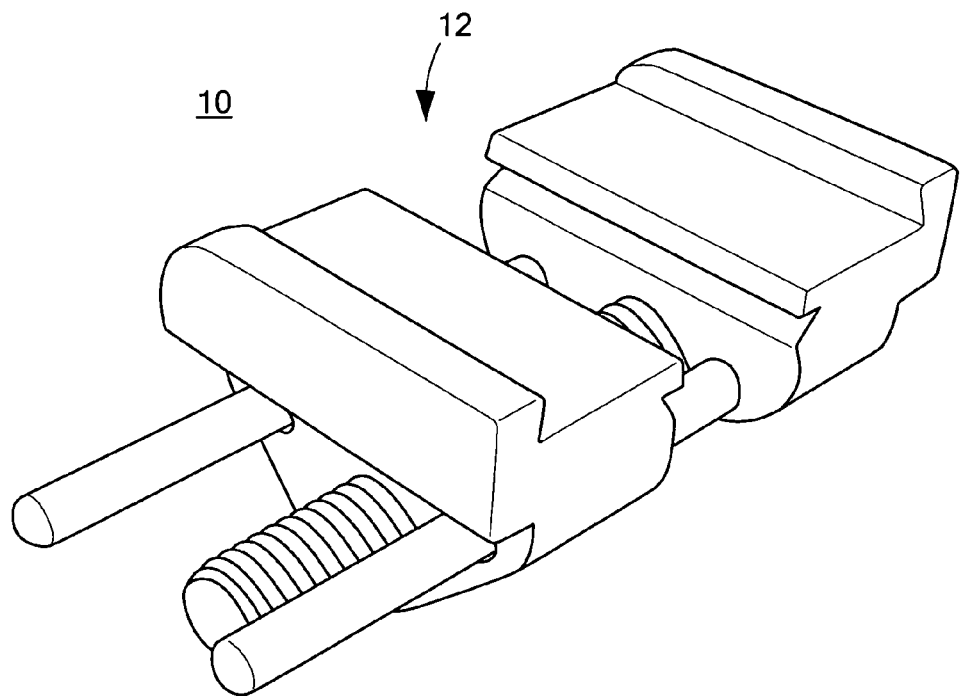
FIG. 1 is a three-dimensional view of a typical conventional sharpening jig.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
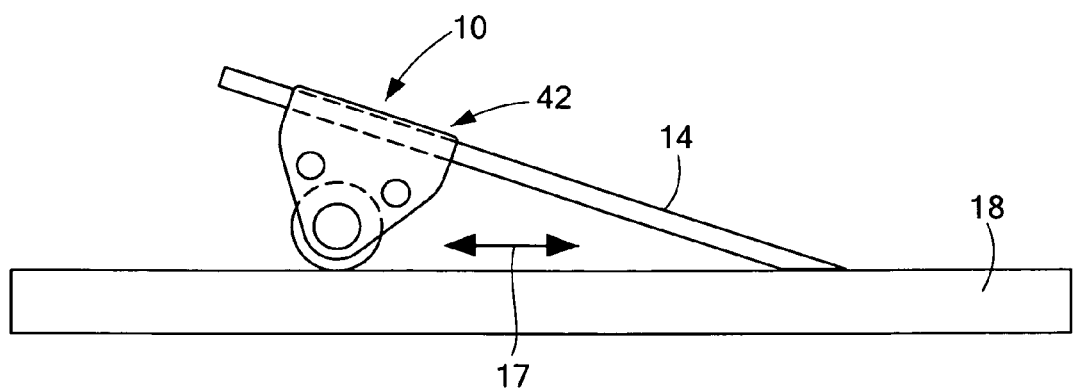
FIG. 2 is a three-dimensional view showing a blade in contact with the sharpening jig shown in FIG. 1.
Figure 3:
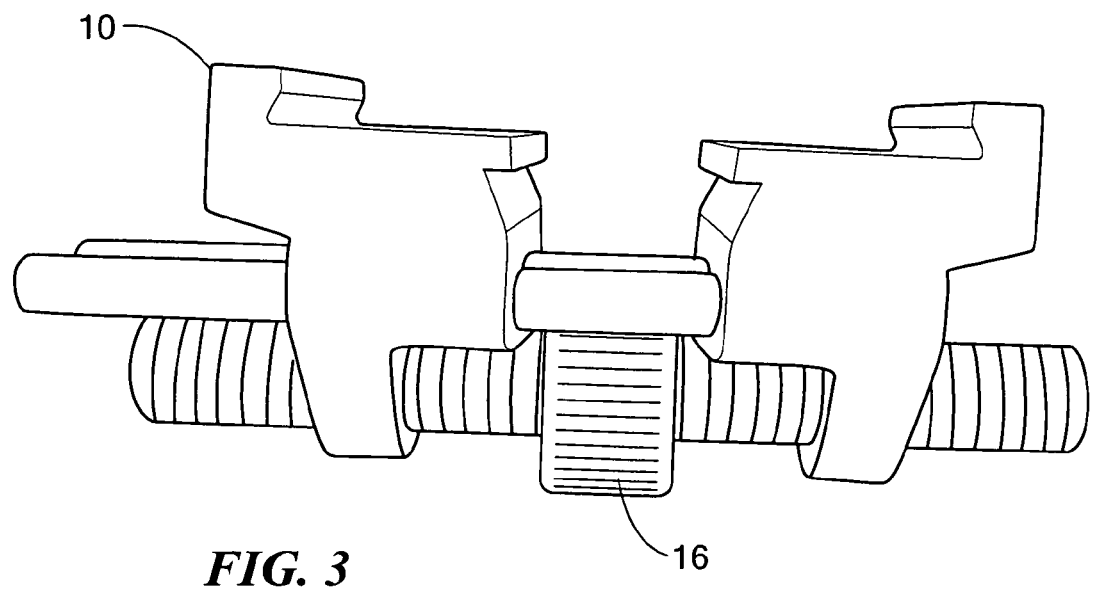
FIG. 3 is a three-dimensional end-view of the sharpening jig shown in FIGS. 1 and 2.

Conventional sharpening jigs used to sharpen irons of a hand plane or chisel typically rely on some type of clamping device to secure the iron or chisel to the jig and wheels which move the iron along the grit surface of the sharpening stone. For example, conventional jig 10, FIG. 1, includes clamp 12 which is used to secure hand plane iron 14, FIG. 2, to jig 10. FIG. 3 shows in further detail wheel 16 coupled to jig 10 which moves on top of an abrasive surface. In order to sharpen a cutting blade, the user sets the desired angle of the iron with a ruler to indirectly determine approximate angle by extension and a calibration scale (inch vs. degree). Then, the user strokes jig 10, FIG. 2, and blade 14 in fore-and-aft direction indicated by arrow 17, on sharpening stone 18. However, the rolling and skidding of wheel 16 on abrasive surface 18 can create grooves which can damage sharpening stone 18. This may require re-dressing of sharpening stone 18. The configuration of iron 14 clamped to jig 10 also limits the available abrasive surface and stroke direction on abrasive surface 18 that can be utilized by sharpening jig 10. Additionally, wheel 18 may develop flats from skids and the bearings of wheel 16 bind with grit slurry. Moreover, the small size of jig 10 may require a very strong hand grip to hold the loaded jig and apply controlled stroke forces, with difficulty increasing at higher angles, often referred to as "white knuckle" gripping.

Figure 4:
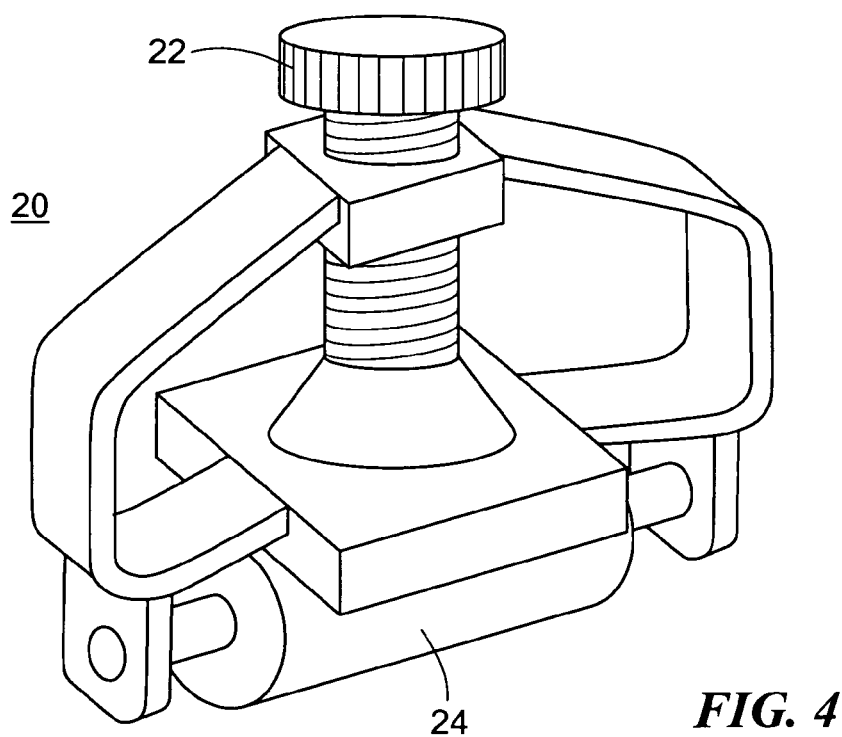
FIG. 4 is a three-dimensional front-view of another conventional sharpening jig.

FIG. 4 shows another example of conventional sharpening jig 20 wherein a cutting blade is clamped thereto using adjustable clamp 22. Jig 20 includes roller 24 which can damage the sharpening stone and wheel 24, similarly as discussed above. Jig 20 also requires "white knuckle" gripping.

Figure 5:
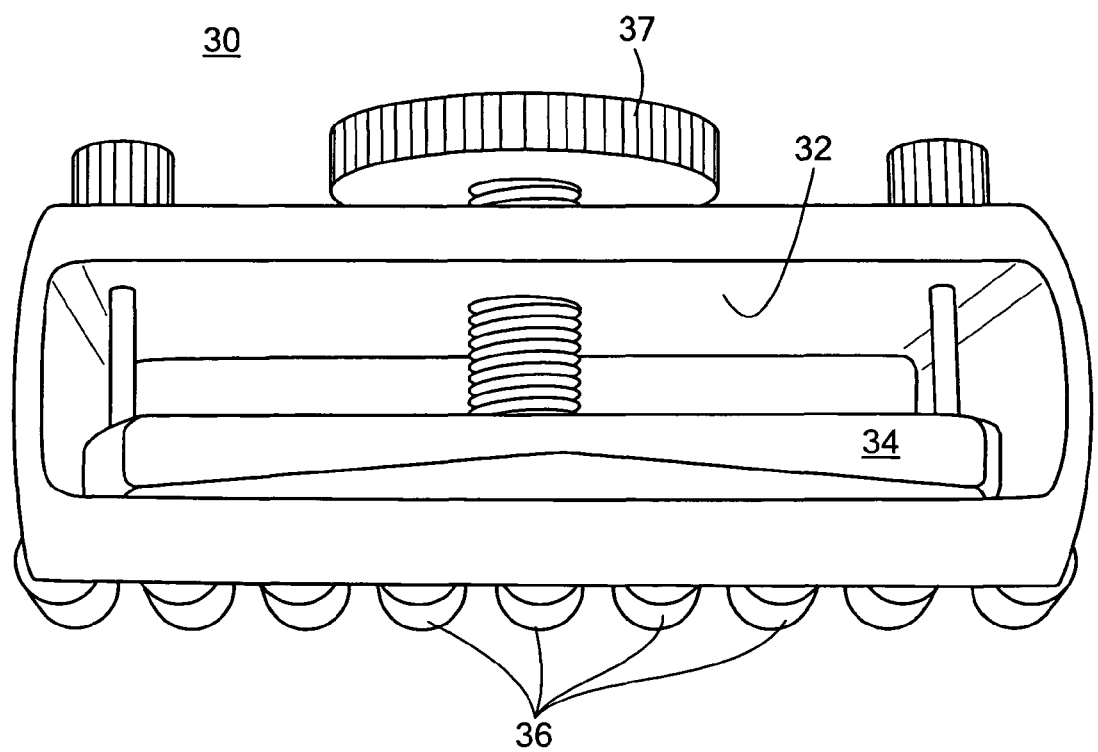
FIG. 5 is a three-dimensional view of another conventional sharpening jig which may be side-stroked on an abrasive surface.

FIG. 5 shows another conventional sharpening jig 30 which is used for side-stroke sharpening. Jig 30 includes clamping device 32 with clamping plate 34, hand screw 37 and wheels 36. In this design, a cutting blade is inserted into clamping device 32 and clamped thereto. In operation, the cutting blade secured in clamping device 32 is stroked sideways (parallel to the line of wheels 36) along the abrasive surface. However, wheels 36 will similarly damage the abrasive surface and vice versa, as discussed above. Jig 30 similarly requires "white knuckle" gripping.

Figure 6A:
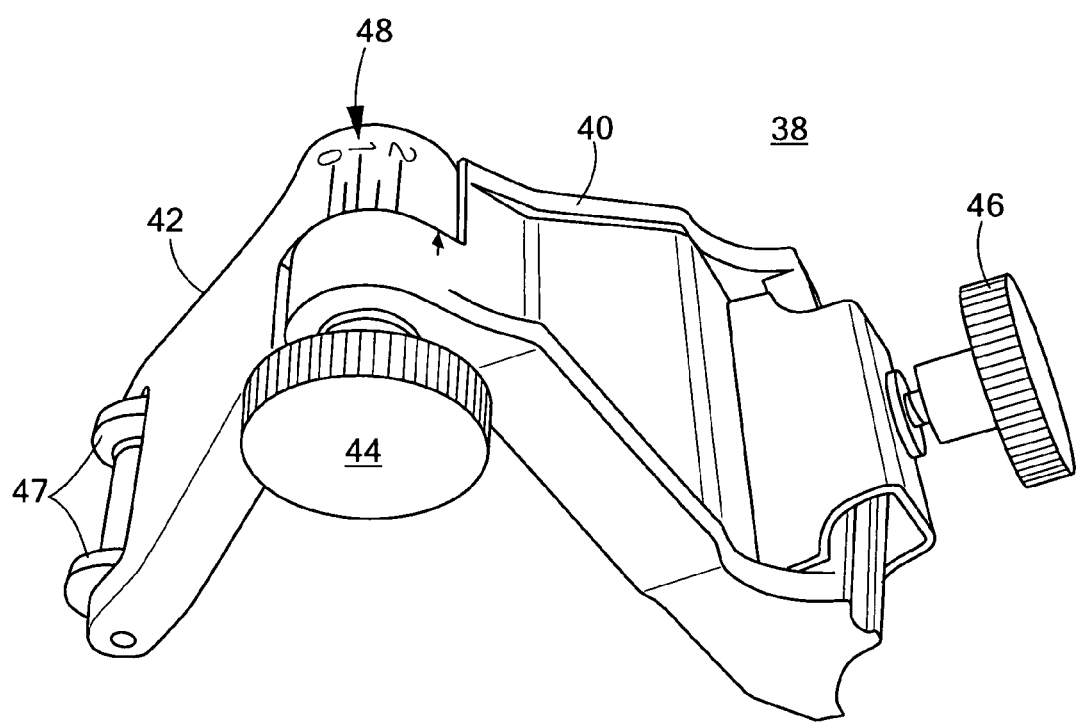
FIGS. 6A and 6B are views showing one example of yet another conventional sharpening jig which may be used to create a bevel on a cutting blade.
Figure 6B:
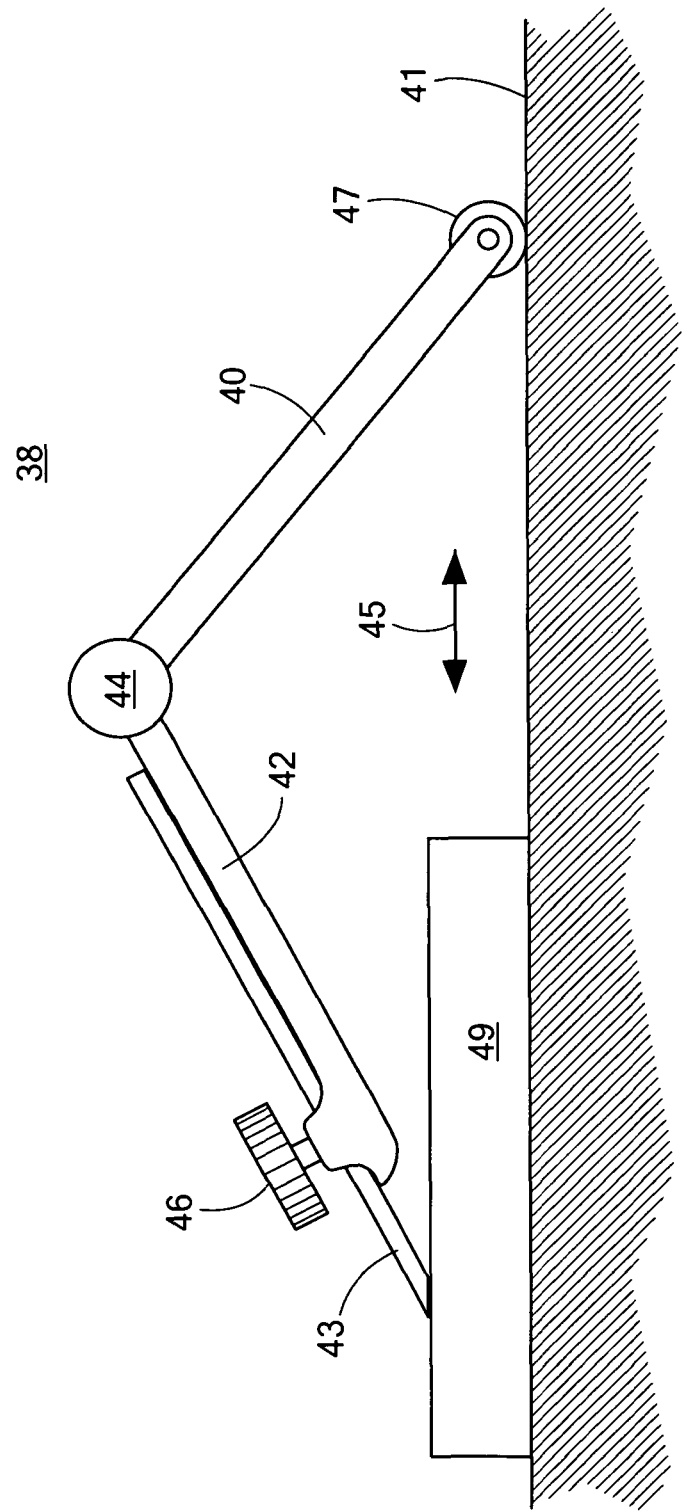

FIG. 6A shows another example of conventional sharpening jig 38 that includes pivotable members 40 and 42 secured together by hand screw 44. Jig 38 also includes clamping device 46 for securing a cutting blade and wheels 47. Small incremental scale 48, a 0, 1, 2 scale as shown, is used to set the inches of stone height on bench so the cutting blade will be sharpened at 30°. In operation, to sharpen cutting blade 43, jig 38, FIG. 6B, is placed proximate to sharpening stone 49 and pushed fore-and-aft in direction 45 with wheels 47 roll on bench 41 to sharpen iron cutting blade 43.

Figure 7:
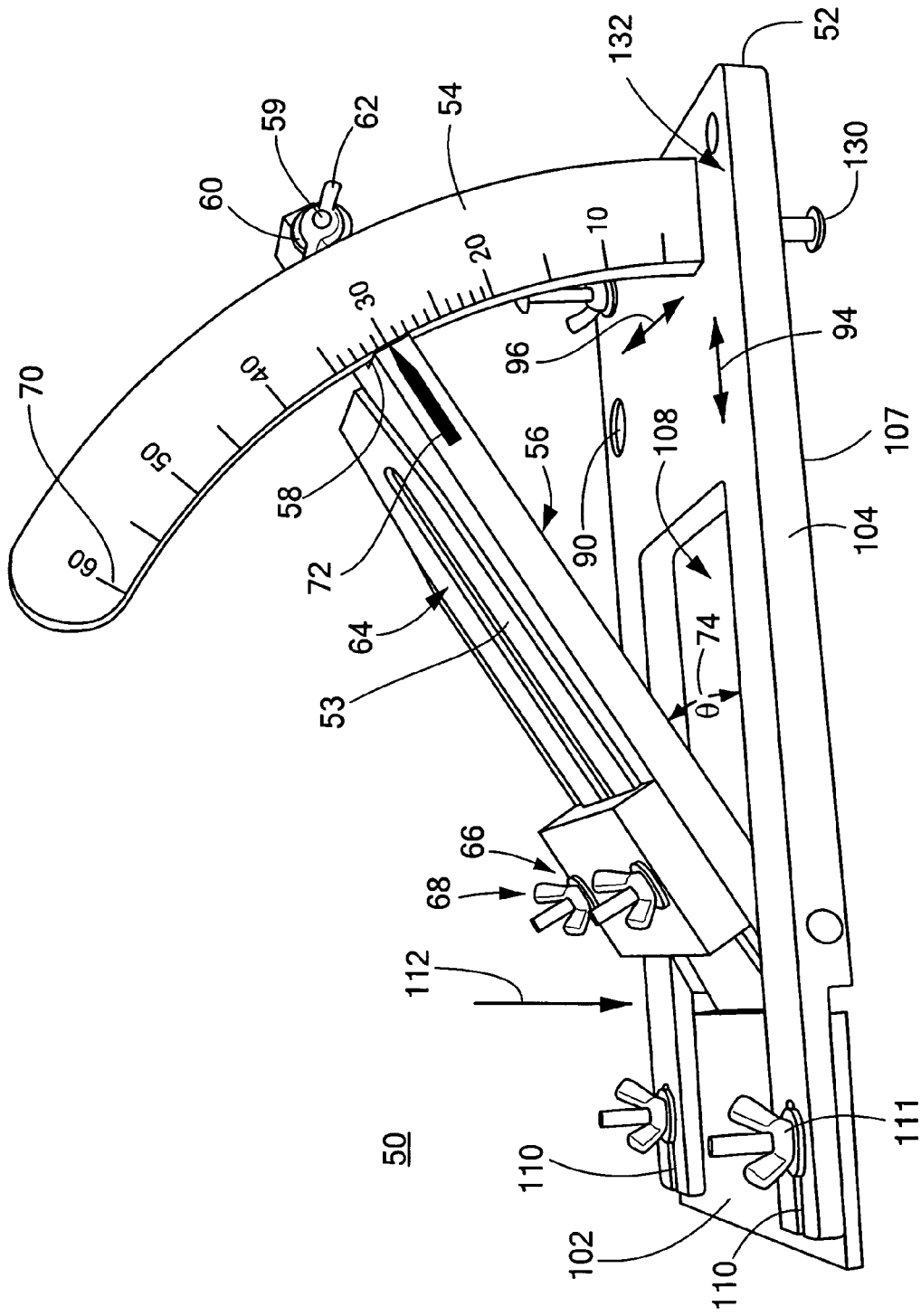
FIG. 7 is a three-dimensional front-view of one embodiment of the universal sharpening jig for a cutting blade of this invention.

There is shown in FIG. 7 one embodiment of universal sharpening jig 50 for a cutting blade of this invention. Universal sharpening jig 50 includes base plate 52, protractor plate 54, and incline plate 56 hingedly coupled to base plate 52 and slideably connected to protractor plate 54, e.g., by recess 58 in incline plate 56 and a fastening device, such as screw 59, washer 60, and nut 62. Incline plate 56 is configured to secure cutting blade 64, e.g., a hand plane iron as shown, a skew iron, a chisel, a skew chisel, a scraper iron, or similar type device, thereto to set and fix the angle of incline plate 56 with respect to base plate 52 to define a sharpening angle of all or a portion of a bevel with respect to flat back 53 surface cutting blade 64. Protractor plate 54 preferably includes degree indicating scale 70 which is used with indictor 72 on incline plate 56 to set the angle of incline plate with respect to base plate to define the sharpening angle provided the base plate 52 is preferably leveled by adjusting the rear glide(s) 130 while observing all azimuth level 90 for bubble centering as the loaded jig 50 rests on the abrasive surface 98. Bench 100 is preferably maintained level. This leveling calibrates the protractor zero and scale setting to read true, discussed in further detail below.

Figure 8:
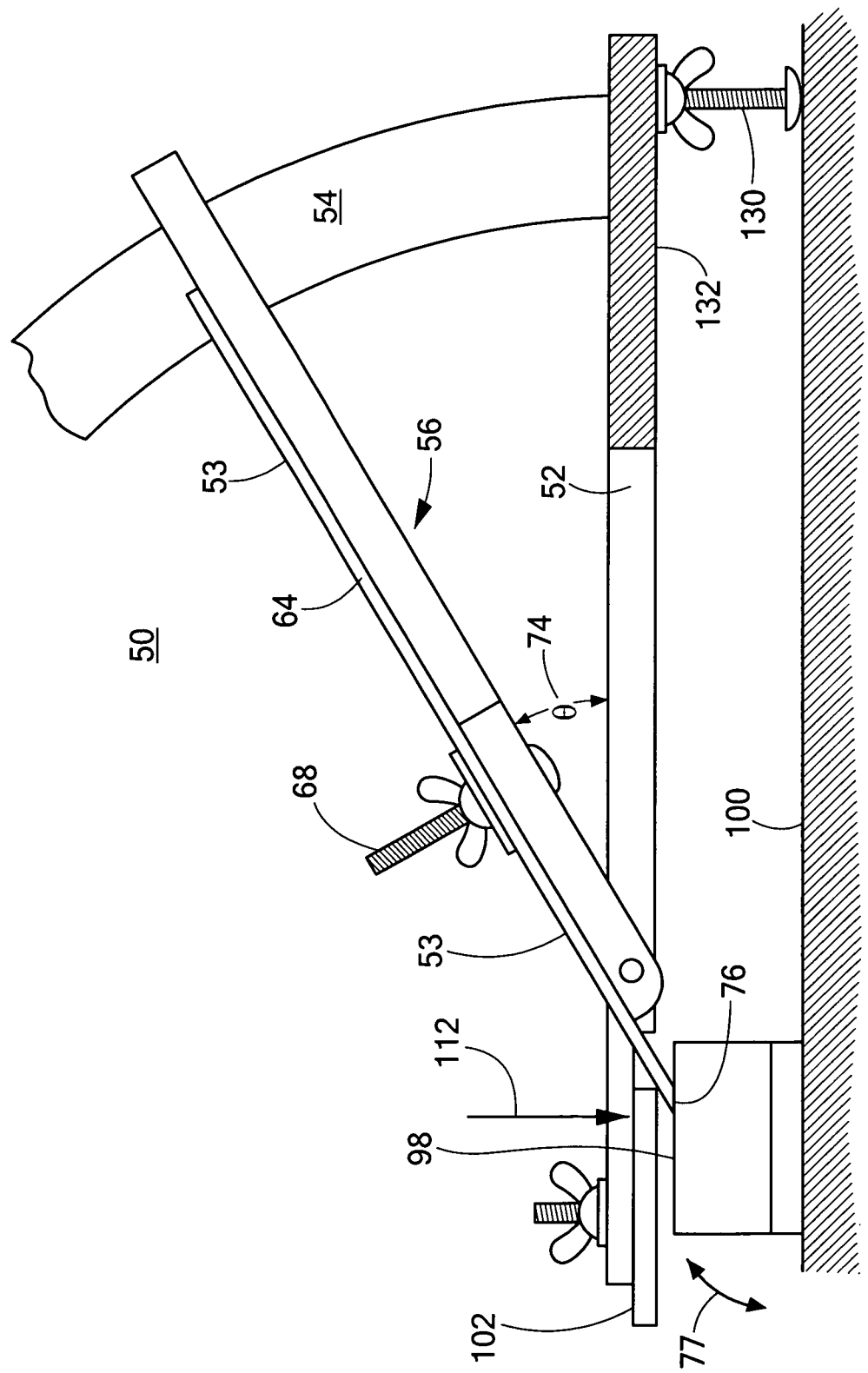
FIG. 8 is a schematic side-view of the universal sharpening jig shown in FIG. 7 in place on a sharpening stone and a level work surface.
Figure 9A:
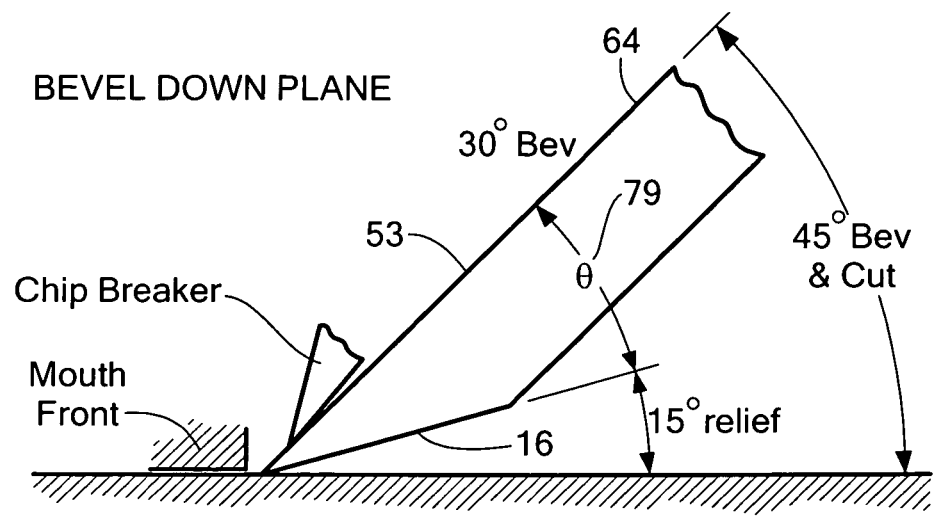
FIGS. 9A-9D depict various examples of a bevel and back bevel on the cutting surface of the cutting blade sharpened with the universal sharpening jig of one or more embodiments of this invention.
Figure 9B:
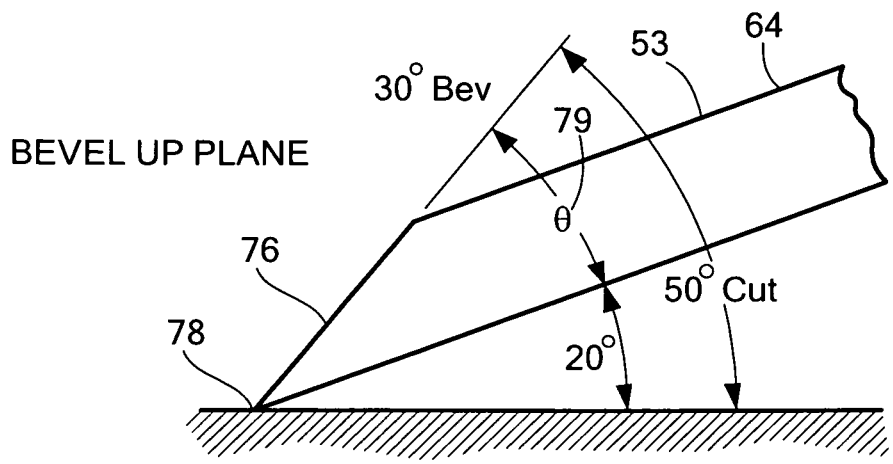

FIG. 8, where like parts may include like numbers, shows in further detail one example of sharpening angle θ-74 that has been set and fixed with incline plate 56 and protractor plate 54. Sharpening angle θ-74 defines the sharpening angle of all or a portion of bevel 76 with respect to flat back 53 of cutting blade 64. One example of the angle of bevel 76 with respect to flat back 53 sharpened by universal sharpening jig 50 is in the range of about 25° to about 60°. FIGS. 9A and 9B show examples of a 30° angle, θ-79, between bevel 76 and flat back 53 created on cutting blade 64 when its cutting blade 64 is sharpened on an abrasive surface 98, FIG. 8, e.g., by moving universal sharpening jig 50, FIGS. 7 and 8 on abrasive surface 98 in a side-stroke direction indicated at 77 with sharpening angle θ-74 FIG. 8 set and fixed by incline plate 56 and protractor plate 54. Further details of the movement of universal sharpening jig 50 on an abrasive surface 98 are discussed below with reference to FIGS. 32-35.

Figure 10:
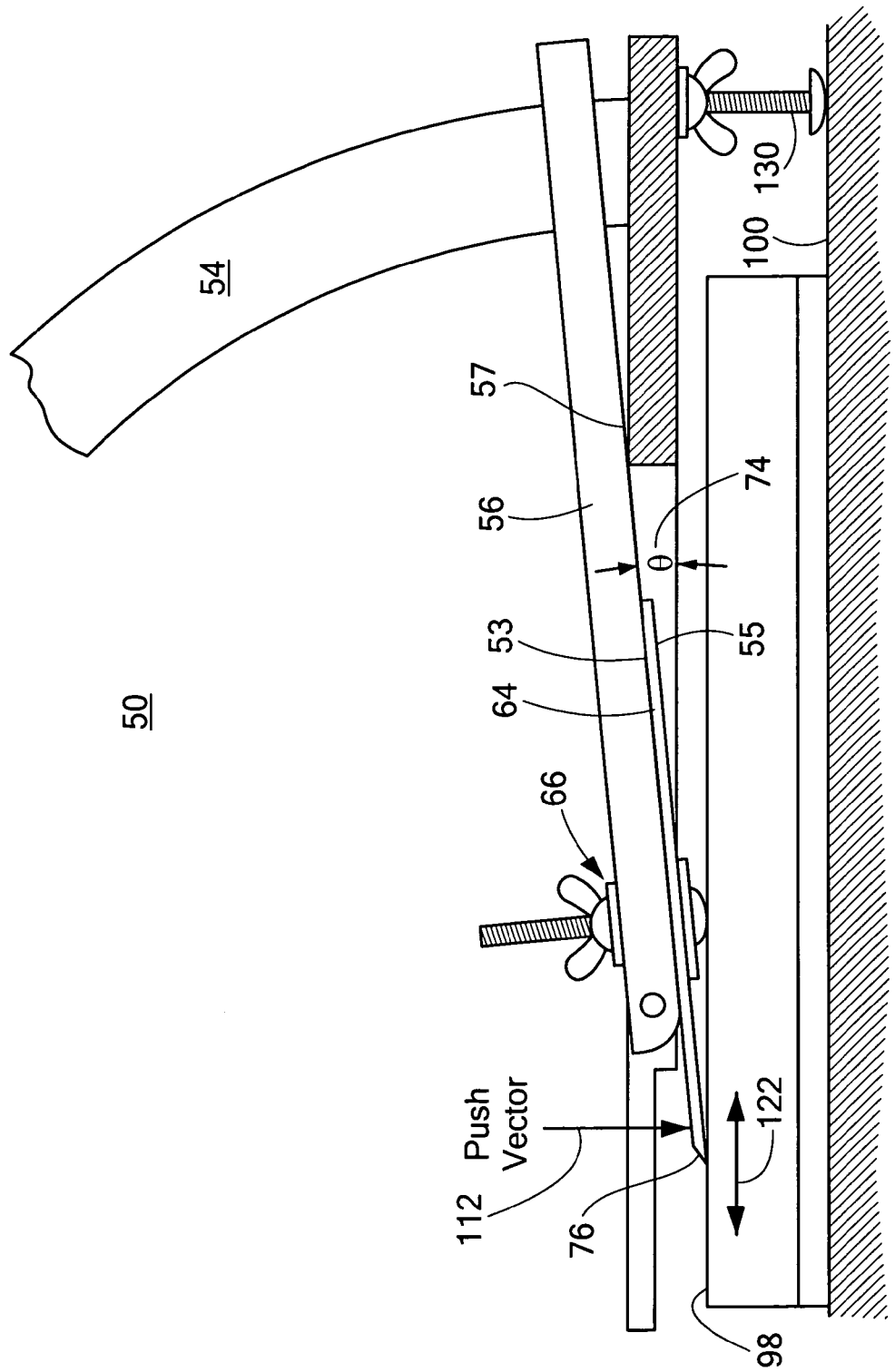
FIG. 10 is a schematic side-view showing one example of a cutting blade secured to the back side of the incline plate of the universal sharpening jig shown in FIG. 7 used to create a back bevel at 5°.

In other examples, cutting blade 64, FIG. 10, may be attached to the bottom side 57 of incline plate 56 in the bevel up position, where bevel 76 is shown facing upwards. In this design, incline plate 56 with clamping device 66 and protractor plate 54 set and secure cutting blade 64 mounted to back side 57 of incline plate 56 and at angle θ-74 to provide a back bevel on cutting blade 64 in the range of about 5° to about 20° when universal sharpening jig 50 is moved on abrasive surface, e.g., moved in the fore-and-aft directions, indicated by arrow 122, or in any other desired directions, as discussed in further detail below with reference to FIGS. 32-32. In this example, push plate 102 is not used.

Figure 9C:
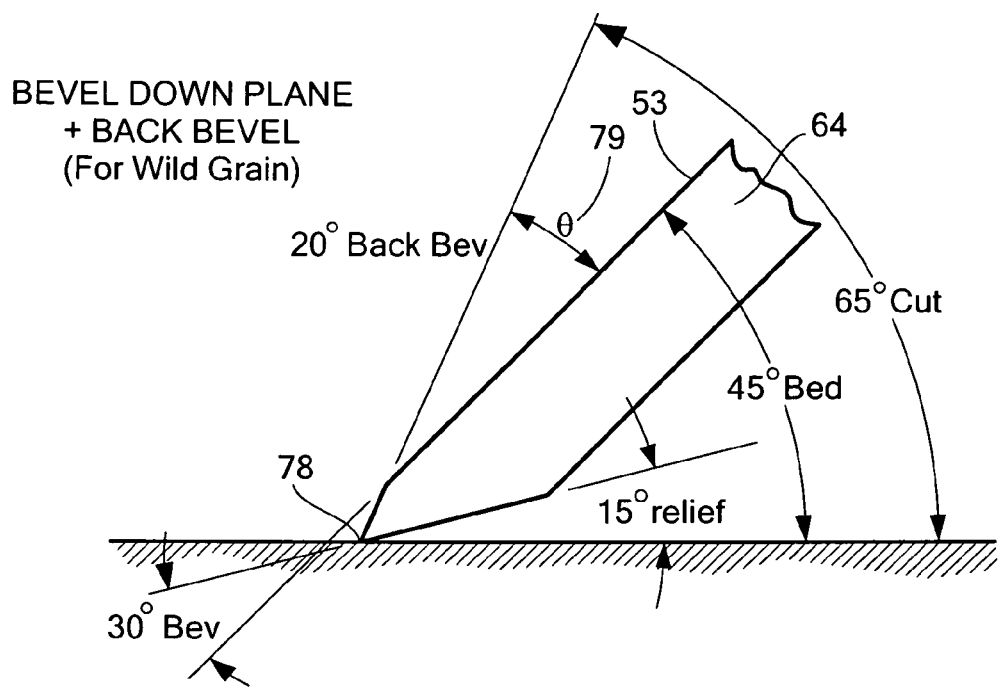
Figure 9D:
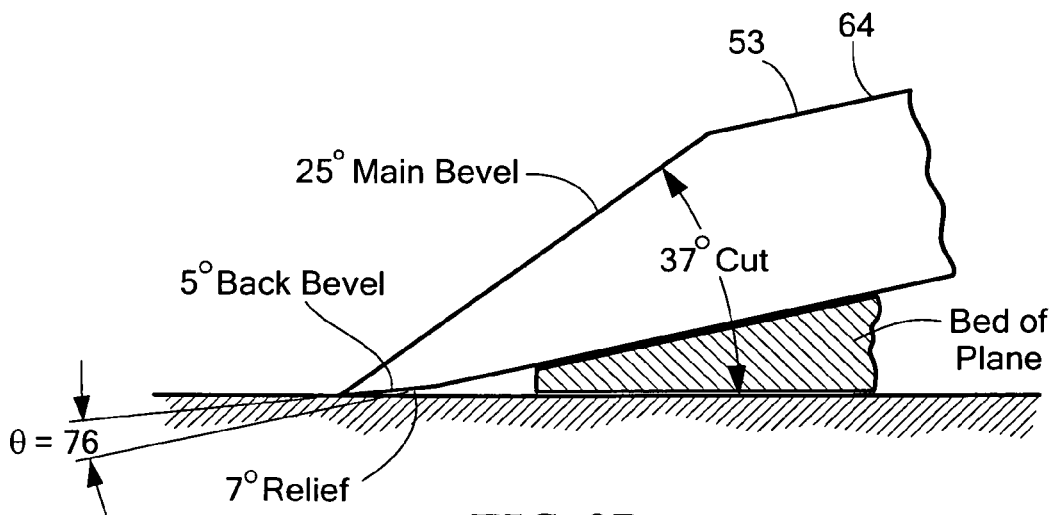

FIG. 9C shows one example of 20° back bevel angle θ-79 created on cutting blade 64 when universal sharpening jig 50, FIG. 10, is moved in the fore-and-aft directions on abrasive 98, e.g., indicated at 122, for use in wild grain smoothing. FIG. 9D shows another example of 5° back bevel, angle θ-76 created on cutting blade 64 as shown in FIG. 10 in combination with a main bevel of 25°, indicated at θ-74 as shown in FIG. 8 for use in smoothing end grain surfaces of wood. In other examples, universal sharpening jig 50, FIG. 11, with incline plate 56, clamping device 68, and protractor plate 54, may be configured to secure chisel 80 to incline plate 56 to set and fix the angle of incline plate 56 with respect to base plate 52 to define sharpening angle θ-74 of all or a portion of bevel 76' with respect to flat back 53' of chisel 80, similar as discussed above with reference to one or more of FIGS. 7-9D.

Figure 11:
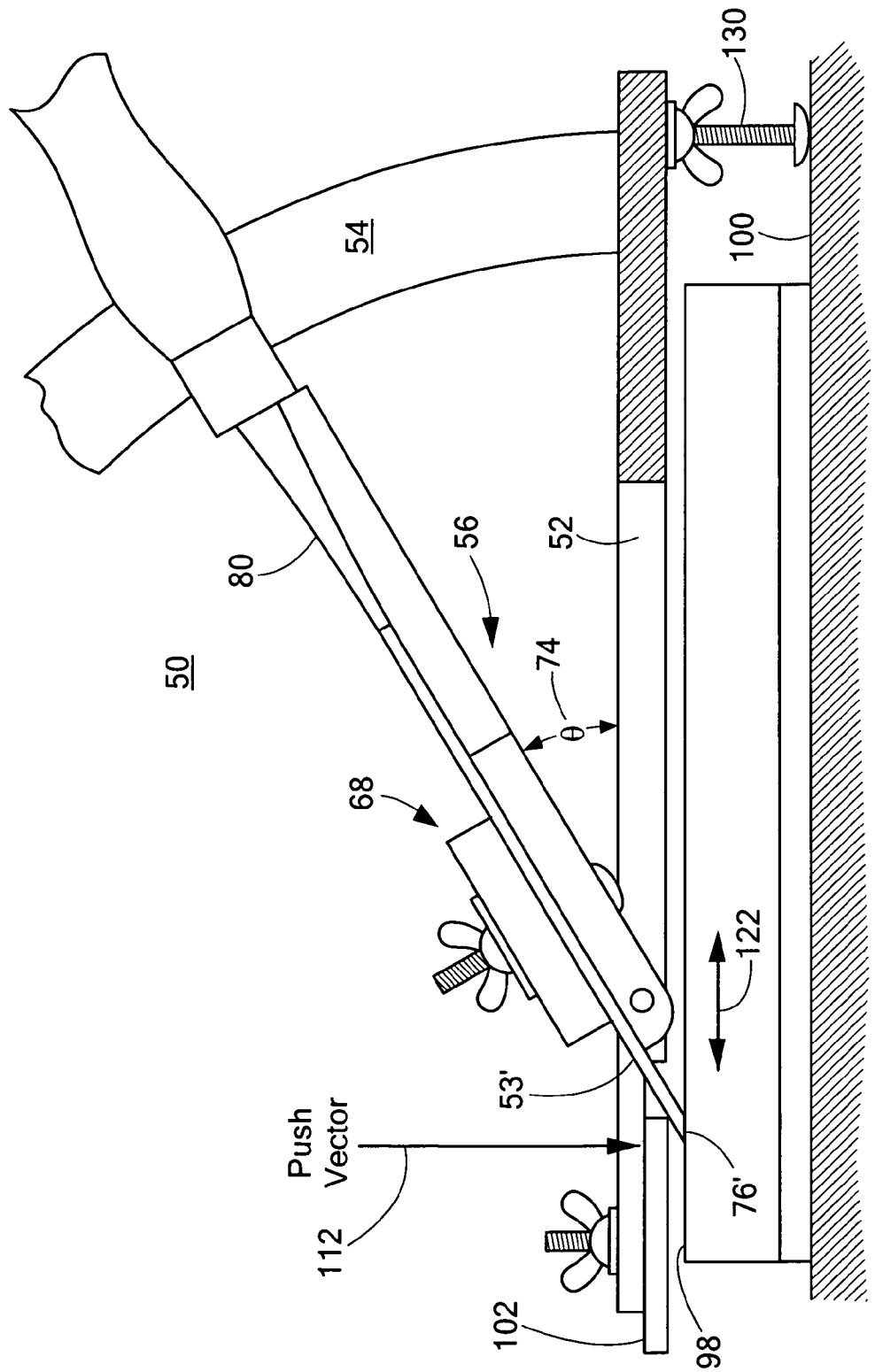
FIG. 11 is a schematic side-view showing an example of a chisel secured to the incline plate of the universal sharpening jig shown in FIG. 7.
Figure 12:
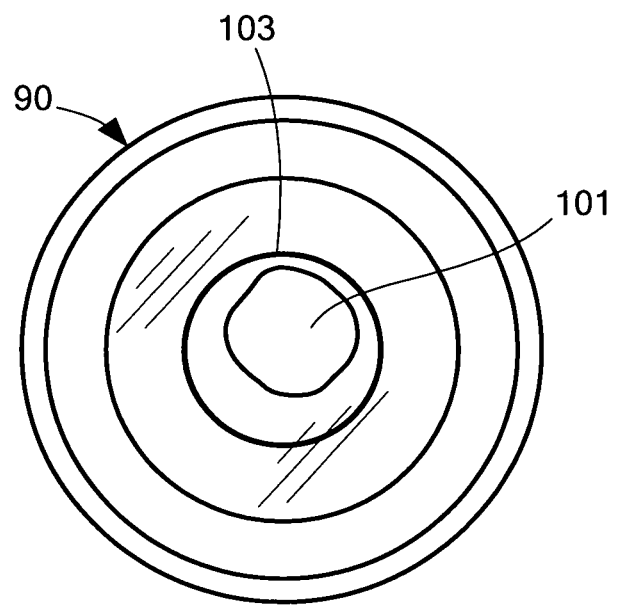
FIG. 12 is an enlarged view of the all azimuth spirit level embedded in the base plate of the universal sharpening jig shown in FIG. 7.
Figure 22:
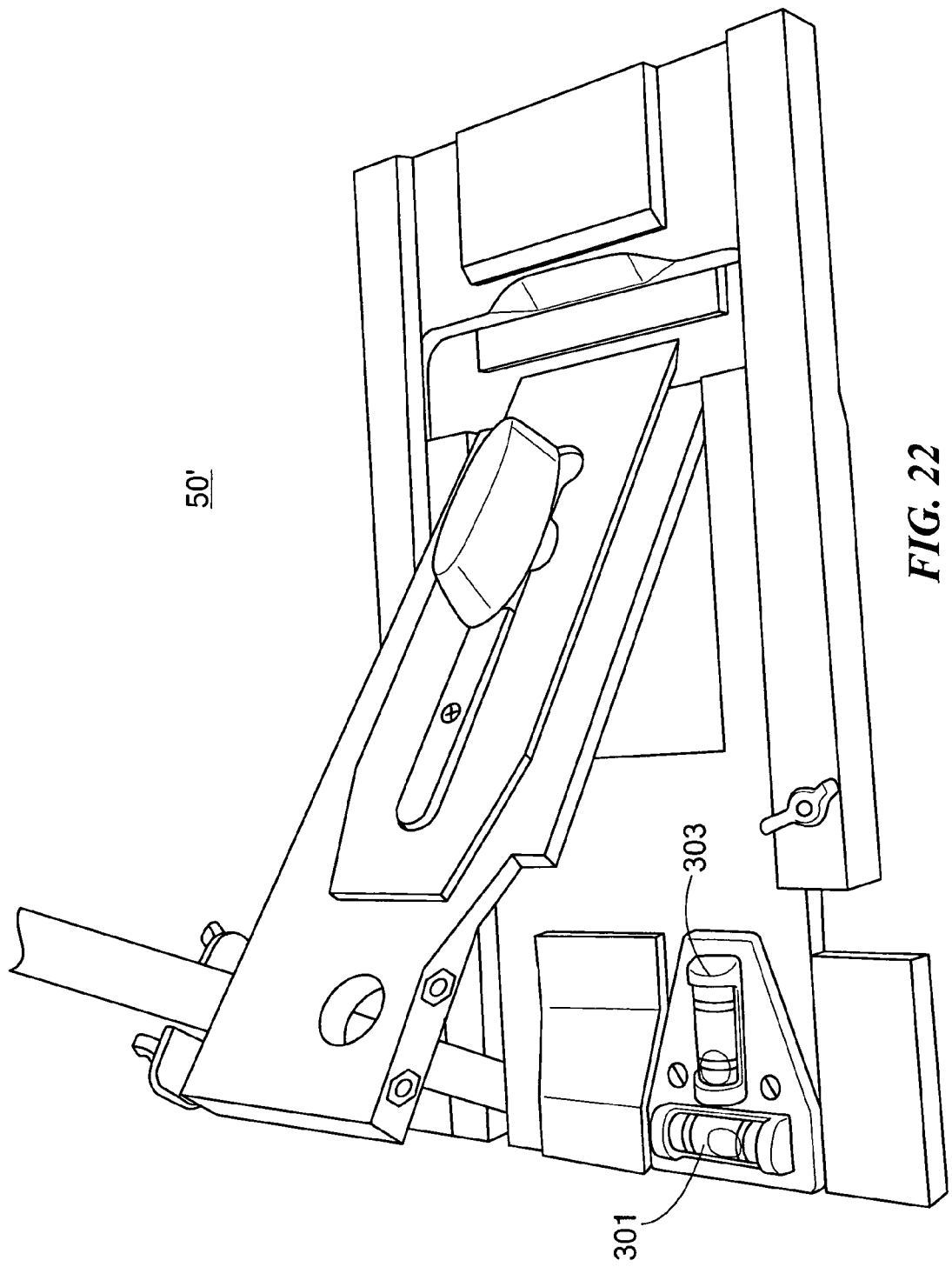
FIG. 22 is a three-dimensional top front-view of the universal sharpening jig shown in FIGS. 20 and 21 showing another embodiment of a level secured to the base plate.

Universal sharpening jig 50, FIG. 7, also preferably includes all azimuth spirit level 90 configured to easily determine if base plate 52 is longitudinally and laterally level, indicated at 94 and 96, respectively, with respect to abrasive surface 98, FIGS. 8, 10, and 11, preferably located on level work surface 100. FIG. 12 shows an enlarged view of one example of all azimuth level 90. All azimuth level 90 may be used to ensure the user's strokes on the abrasive surface are co-planer such that abrasive surface is parallel to level work surface on a level bench. Base plate 52 is preferably leveled with cutting blade 64 clamped in jig 50 and resting on abrasive surface 98 by adjusting glide 130, or glides 130, 132, e.g., as shown in at least FIGS. 7, 8, 10, and 11 (discussed in further detail below) while observing the spirit level 90, FIG. 12, and centering the bubble 101 in ring 103. Although, in this example an all azimuth spirit level is used, in other embodiments, a plurality of levels, e.g., levels 301, 303, FIG. 22, or an electronic level may also be used.

Figure 13:
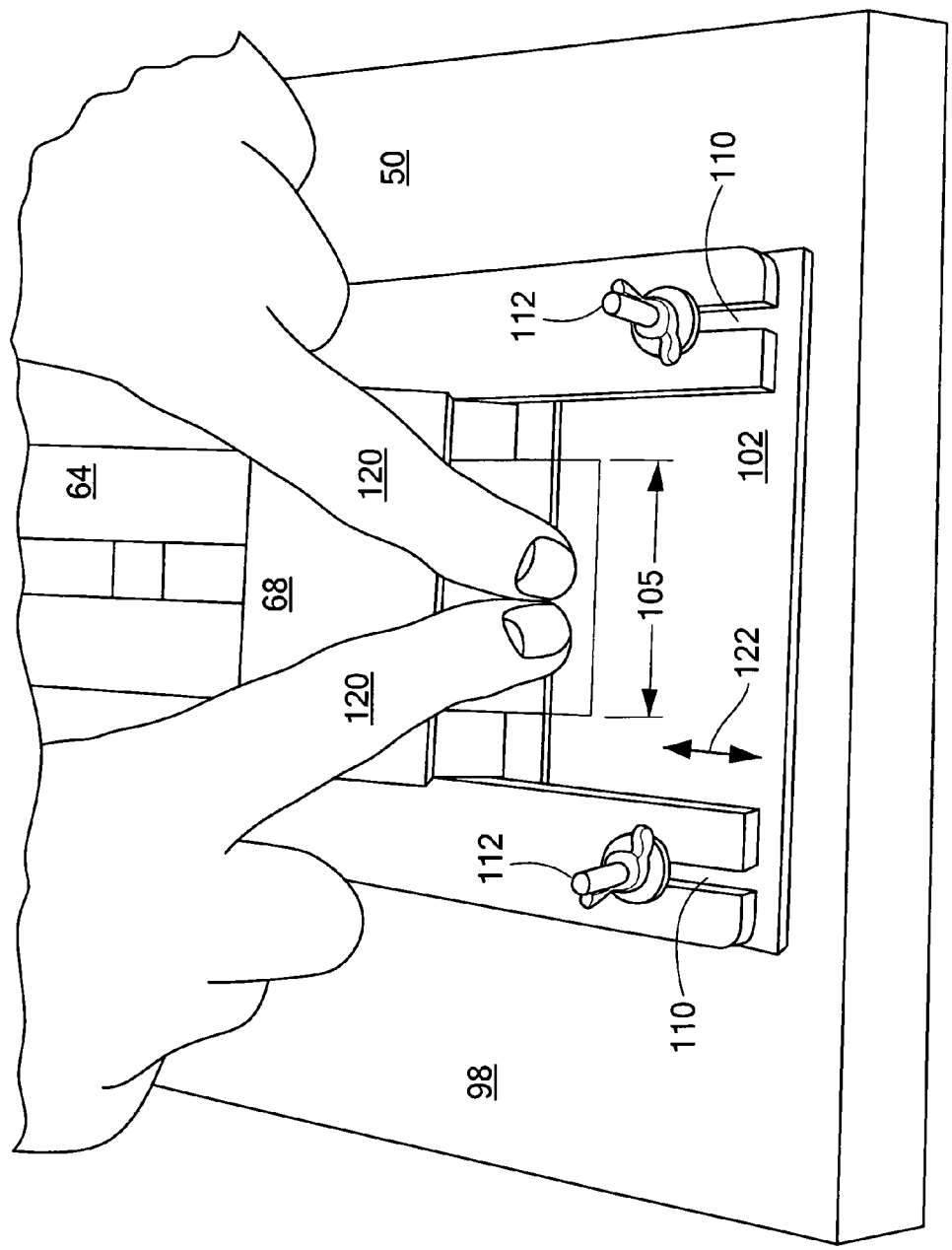
FIG. 13 is a three-dimensional view showing an example of a user applying a vector force to the push plate of the universal sharpening jig shown in one or more of FIGS. 7-12.

Universal sharpening jig 50, FIG. 7, also preferably includes all azimuth spirit level 90 configured to easily determine if base plate 52 is longitudinally and laterally level, indicated at 94 and 96, respectively, with respect to abrasive surface 98, FIGS. 8, 10, and 11, preferably located on level work surface 100. FIG. 12 shows an enlarged view of one example of all azimuth level 90. All azimuth level 90 may be used to ensure the user's strokes on the abrasive surface are co-planer such that abrasive surface is parallel to level work surface on a level bench. Base plate 52 is preferably leveled with cutting blade 64 clamped in jig 50 and resting on abrasive surface 98 by adjusting glide 130, or glides 130, 132, e.g., as shown in at least FIGS. 7, 8, 10, and 11 (discussed in further detail below) while observing the spirit level 90, FIG. 12, and centering the bubble 101 in ring 103. Although, in this example an all azimuth spirit level is used, in other embodiments, a plurality of levels, e.g., levels 301, 303, FIG. 22, or an electronic level may also be used. Universal sharpening jig 50, FIG. 7, also includes push plate 102 slideably attached proximate front 104 of base plate 52 and co-planar with bottom surface 104 of base plate 52. Push plate 102 is preferably positioned in contact with the upper surface of cutting blade 64 that is clamped to upper surface of incline plate 56 with sharpening angle θ-74 set and locked as discussed above. Thus, push plate 102 may contribute to securing cutting blade 64 to incline plate 56. Preferably, push plate 102 may be made of a transparent material so that swarf, the sharpened edge formation, wire edge formation, and location of bevel on the abrasive surface may be viewed when jig 50 is used to sharpen a cutting blade, e.g., as shown in FIG. 13. In one example, push plate 102, FIGS. 7 and 13, is slideably attached to base plate 52 via cutout 108, FIG. 7, in base plate 52, recesses 110, and fastening devices 111. Push plate 102 is configured to position a user-applied force vector 112 FIGS. 8, 10, and 11 thereon and directly apply force vector 112 closely proximate the intersection of bevel 76, and flat back 53 and abrasive surface 98 to reduce destabilizing moments and user energy needed to create sharpened edge 78 on cutting blade 64. FIGS. 8, 10, and 11 show examples of user-applied force vector 112 on push plate 102. FIG. 13 shows an example of a user applying a force vector 112 on push plate 102 via fingers 120 and 121 to move universal sharpening jig 50, in this example, fore-and-aft, indicated at 122, on abrasive surface 98, to sharpen all or a portion of the bevel with respect to the flat back of the cutting blade, as discussed above.

Figure 14:
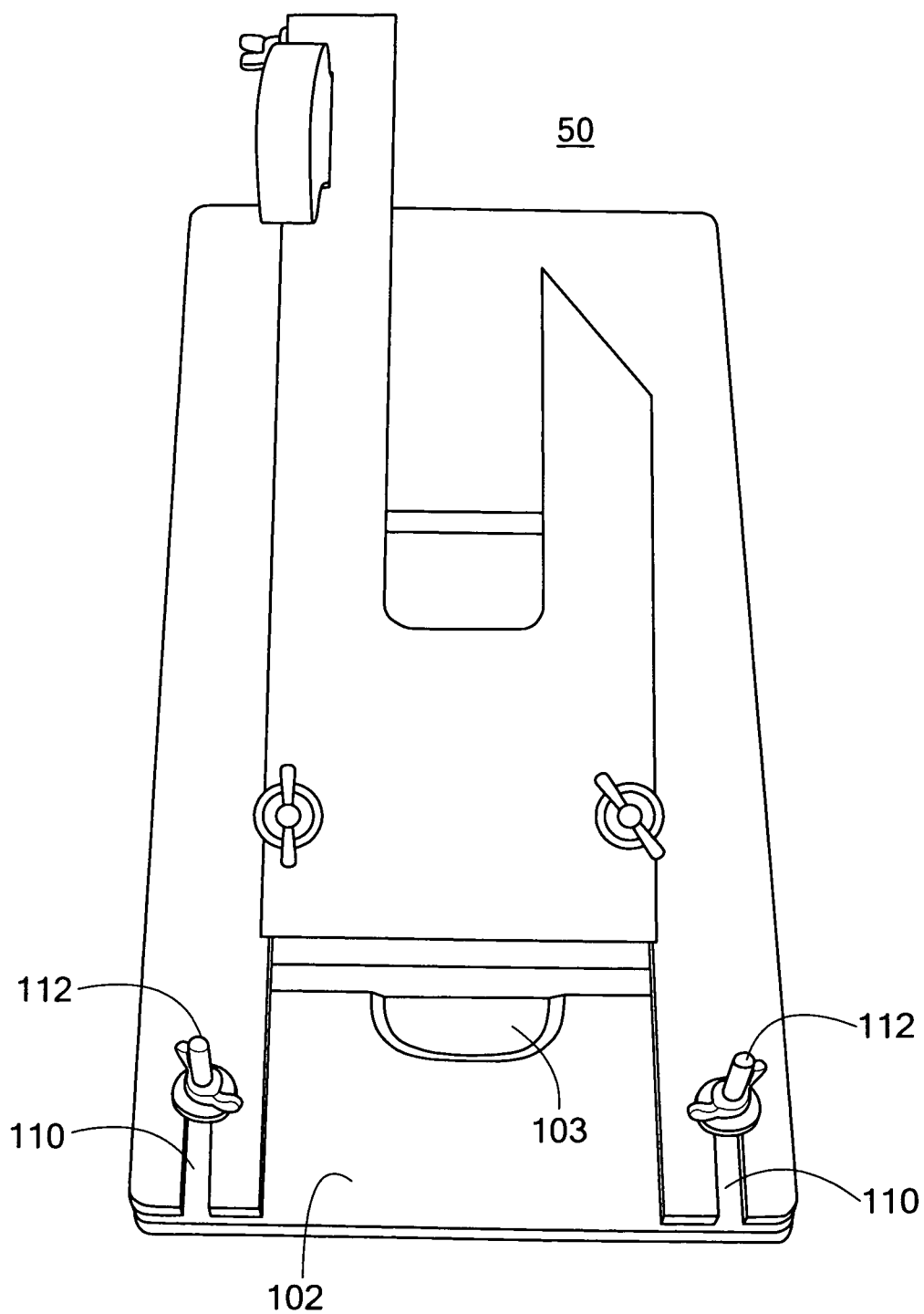
FIG. 14 is a three-dimensional front-view showing one example of a recess in the push plate of the sharpening jig shown in one or more of FIGS. 7-13.
Figure 15:
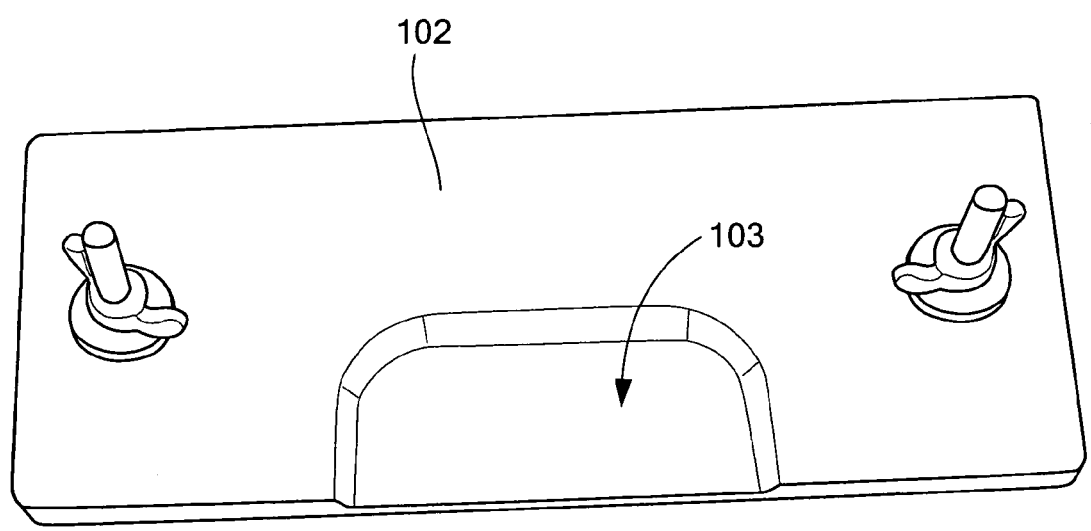
FIG. 15 is a three-dimensional front top-view showing in further detail the recess shown in FIG. 14.

In one embodiment, universal sharpening jig 50, FIG. 14, where like parts have been given like numbers, includes push plate 102 which includes recess 103. Recess 103 is configured to lower the height of user-applied force vector 112, FIGS. 8, 10, 11 and 13, to further position user-applied force vector 112 more closely proximate the intersection of bevel 76 and abrasive surface 98 to further reduce de-stabilizing moments and user energy needed to create a sharpened edge between bevel 76 and flat back 53. FIG. 15 shows in further detail the structure of one example of recess 103 in push plate 102. FIGS. 16A and 16B are schematic top and end views showing in further detail one example of the structure of recess 103 and push plate 102. In one example, recess 103 is approximately 1½" in diameter and includes chamfer 105.

Figure 19:
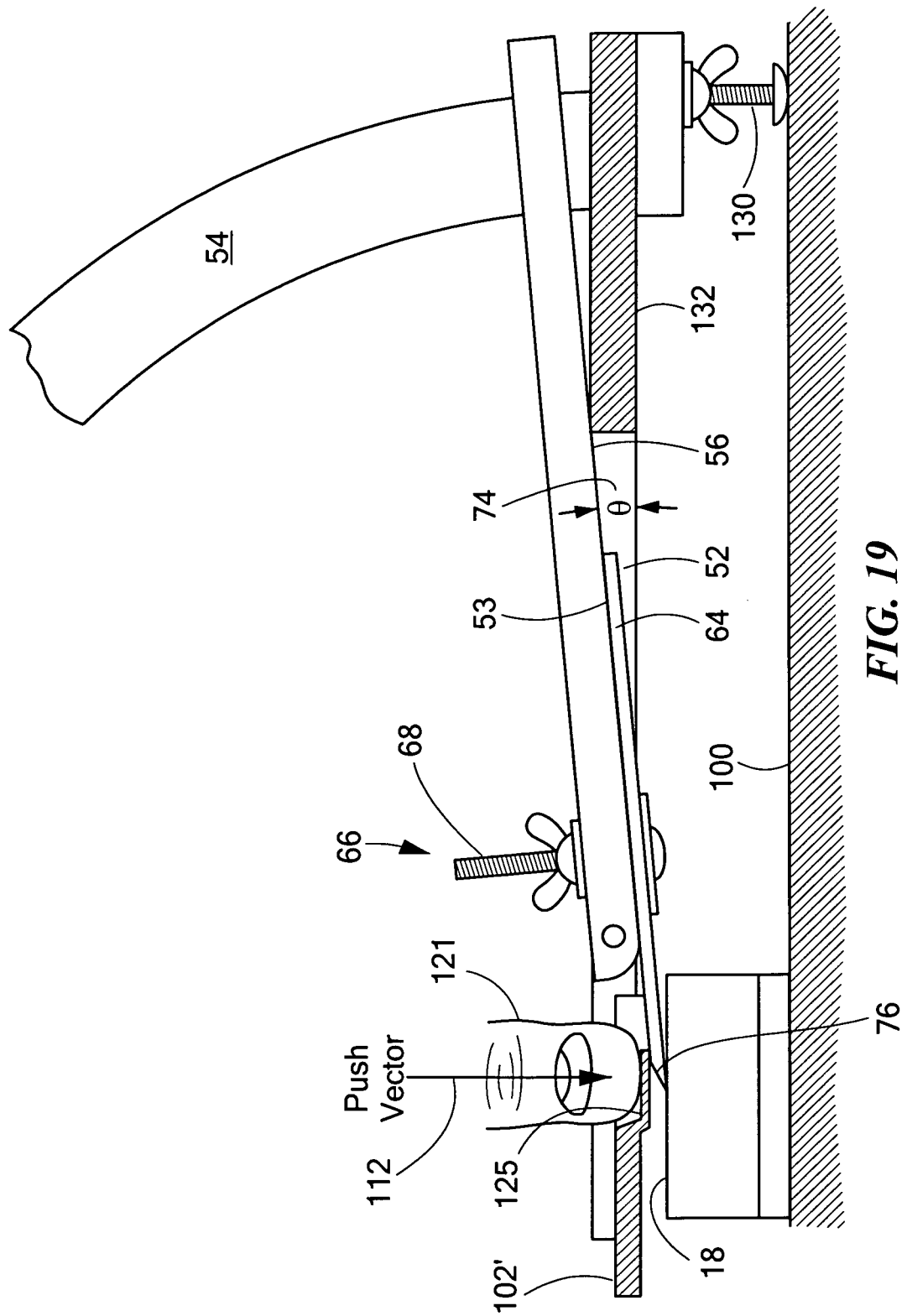
FIG. 19 is a schematic side-view showing one example of a cutting blade secured to the back side of the incline plate of the universal sharpening jig of this invention employing the push plate shown in FIGS. 17A-17B.

In another example, push plate 102', FIGS. 17A and 17B, may include recess 103' includes design stepped plate 117 with stepped edges 113 and 115. The stepped down edge plate design of the push plate 102' is preferably for contact with the blade at angles outside the above range of most frequent beveling, e.g., for back beveling at approximately 5°-15° with cutting blade 64 in the bevel up position, e.g., as shown in FIGS. 10 and 19. Push plate 102' is reversible so that either continuous edge 173, FIG. 17A, or stepped down edge 175 with stepped plate 117 of push plate 102' may be brought into contact with the upper side of blade 64. Continuous edge 173 of push plate 102 may be used for beveling in the bevel down position at 45°-60° in the bevel down position, e.g., as shown in at least FIGS. 8 and 11.

Figure 18:
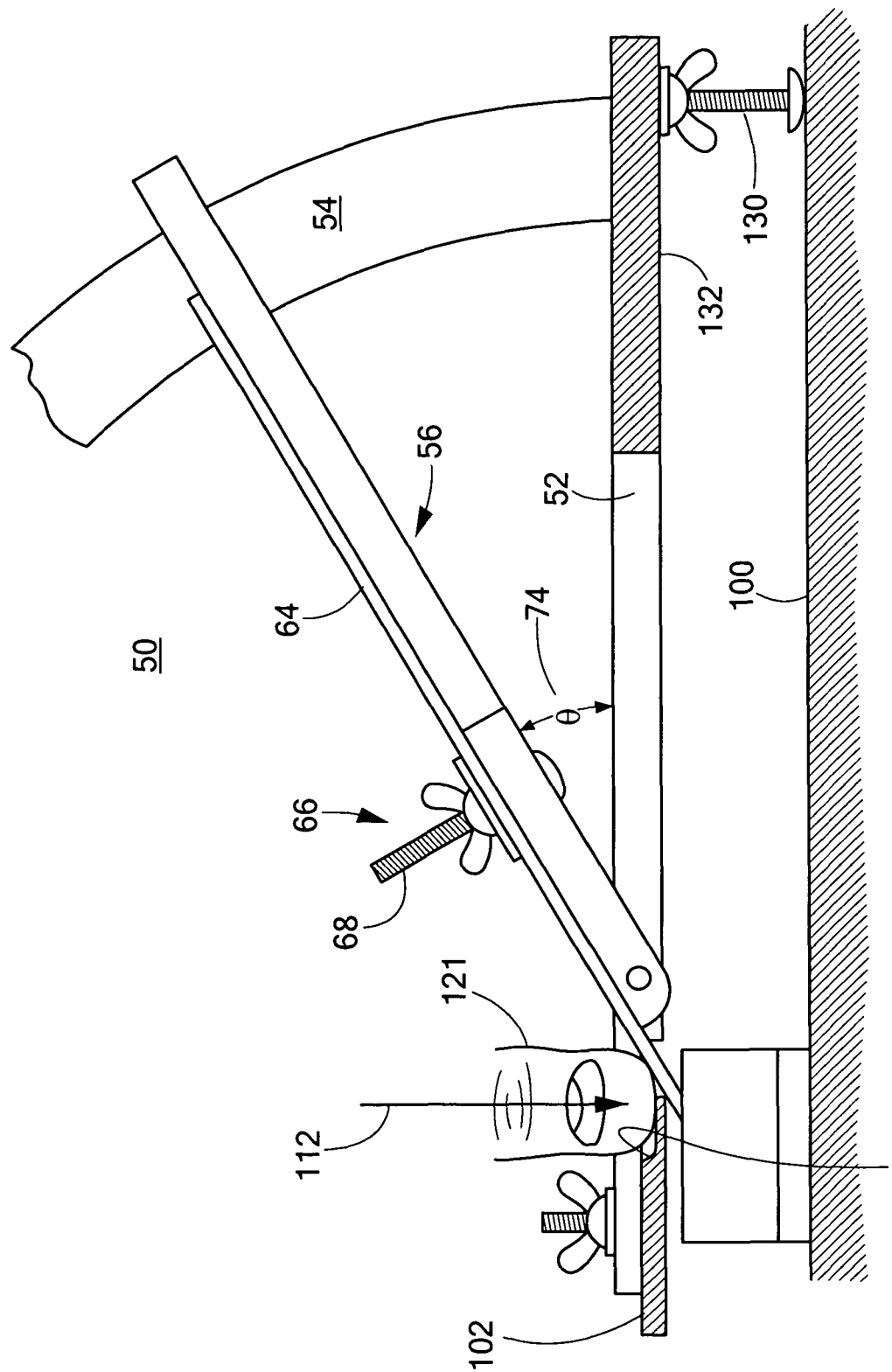
FIG. 18 is a schematic side-view showing one example of the sharpening jig of this invention with the push plate shown in FIGS. 15-16B used to enhance the user-applied vector.

In one exemplary operation, the user places a thumb or finger, e.g., thumb or finger 121, FIG. 18, of each hand in recess 103, FIGS. 14-16B of push plate 102, to apply the user-applied force vector 112 as shown to further reduce de-stabilizing moments and user energy needed to create a sharpened edge between the bevel and the flat back of the cutting blade. FIG. 19 shows an example of a user's thumb or finger 121 of one hand in with recess 103', FIGS. 17A-17B of plate 102', to apply push vector 112 to further reduce de-stabilizing moments and user energy needed to create a sharpened edge between the bevel and the flat back of the cutting blade.

Figure 20:
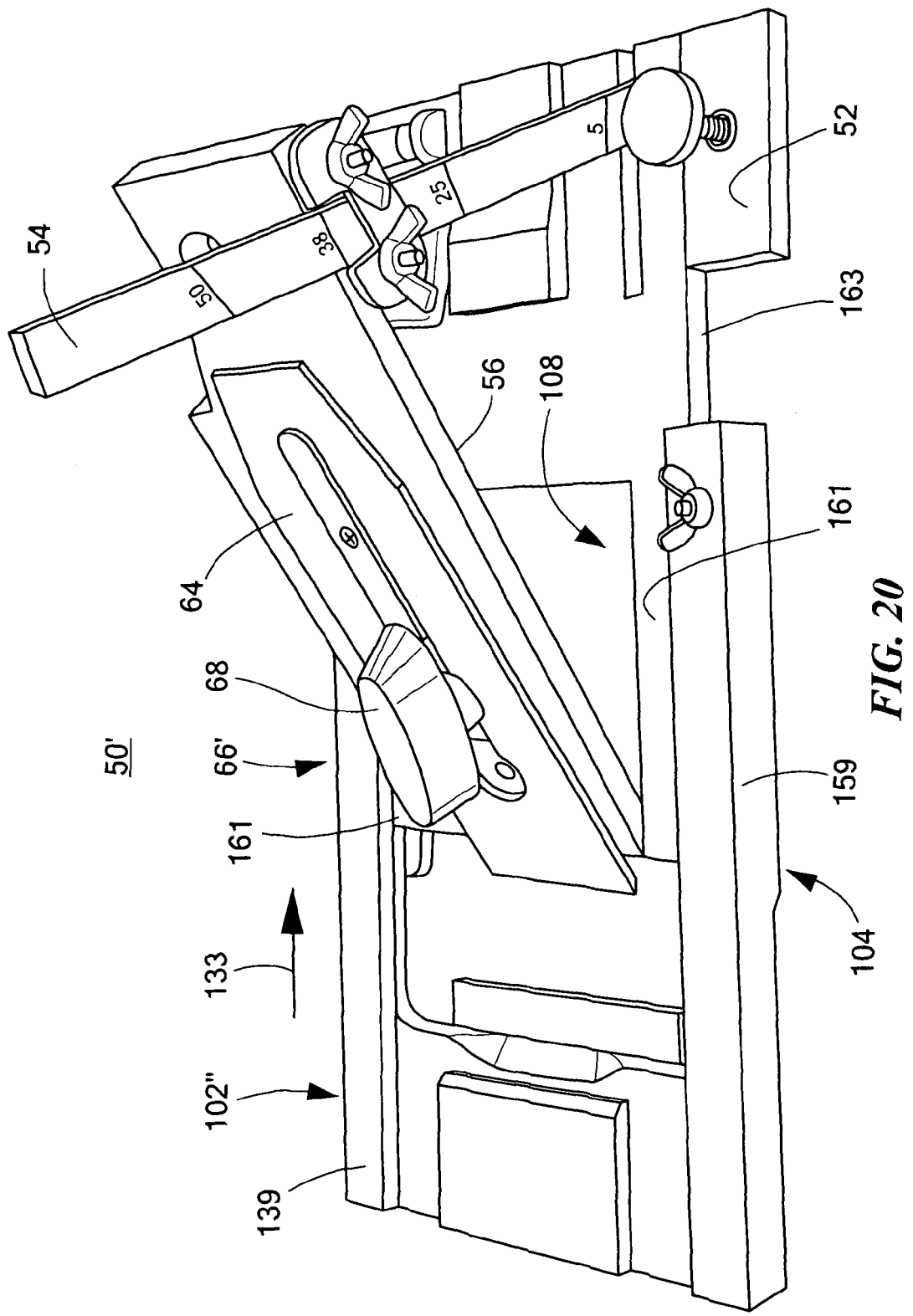
FIG. 20 is a three-dimensional top side-view of another embodiment of the universal sharpening jig of this invention.
Figure 21:
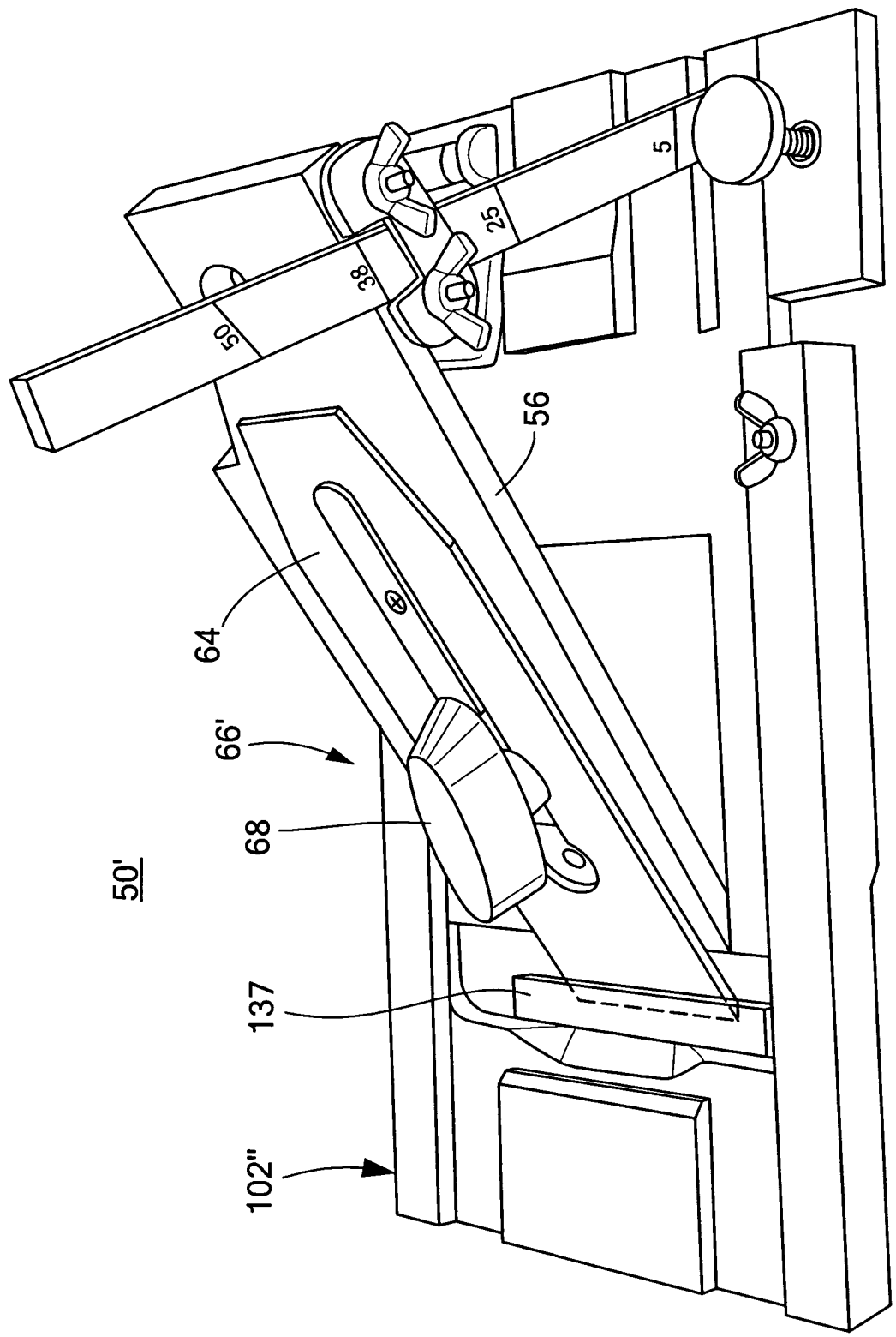
FIG. 21 is a three-dimensional top front-view showing the of the universal sharpening jig in FIG. 7 with the slideable push plate in place and contacting the cutting blade.

Although, as shown in one or more of FIGS. 7-19, push plate 102 is shown slideably attached to base plate 52 via cutout 108, FIG. 7, in base plate 52 with clamping devices 111 and recesses 110, this is not a necessary limitation of this invention. In another design, universal sharpening jig 50', FIG. 20, where like parts have been given like numbers, includes push plate 102" slideably attached proximate front 104 by arms 159 slideably coupled to arms 161 of base plate 52 such that base plate 52 is coplanar with the bottom surface 163 of base plate 52. In this example, push plate 102" slides in direction 133 to further secure cutting blade 64 in place as shown in FIG. 21. In this example, push plate 102" preferably includes plate 137 attached thereto which further secures blade 64 in place to incline plate 56. In this example, clamping device 66' includes a bolt and nut 68 which secures cutting blade 64 to incline plate 56. In one design, universal sharpening jig 50', FIG. 22, includes a plurality of levels, e.g., levels 301 and 303, used to level universal sharpening jig 50' with respect to a preferably level work surface, e.g., as discussed above with reference to one or more of FIGS. 7-12.

The result is, universal sharpening jig 50, FIGS. 7-22, of one or more embodiments of this invention effectively and efficiently provides for sharpening the abrasive surface of cutting blades, such as hand plane irons, chisels (skewed or square), scraper irons, and the like, while reducing destabilizing moments and the energy needed to sharpen the cutting blade. Such a design provides more control to the user when sharpening a cutting blade and eliminates "white knuckle" gripping.

Universal sharpening jig 50, shown in one more of FIGS. 7-22, also preferably includes at least one glide 130, FIGS. 7, 8, 10, and 11 located proximate back 132, FIG. 7, of base plate 52 configured to longitudinally and/or laterally level base plate 52 with respect to abrasive surface 98 and level work surface 100 using all azimuth spirit level 90. At least one glide 130 also provides for movement of jig 50 in all directions by user to effectively and efficiently sharpen the edge between the bevel and flat back of the cutting blade. Glide(s) located at the back of base plate is preferably longer than most abrasive surfaces so glide(s) rides on the work surface located on a bench, not the abrasive surface as found in many conventional sharpening jigs. This allows the entire abrasive surface to be utilized and eliminates the problem of damaging the abrasive surface as found in some of the conventional sharpening jigs discussed above. Moreover, universal sharpening jig 50 does not have wheels that can be damaged. A single glide offers slight roll about longitudinal axis for skillful crowning of a cutting blade by lateral down push shifts or unskilled crowning on curved abrasive surfaces, e.g., as disclosed in U.S. Pat. No. 8,529,316, by the inventor hereof, incorporated by reference herein. Two glides 130, 132 provide for increased control of sharpening jig 50 and provide leveling jig 50 with respect to the abrasive surface discussed in further detail below with reference to FIGS. 32-35.

Preferably, clamping device 66, shown in one or more of FIGS. 7-22 is configured to secure a cutting blade having an edge tool width, e.g., edge tool width 105, FIG. 13, in the range of about ¼" inch to about 3".

Figure 23:
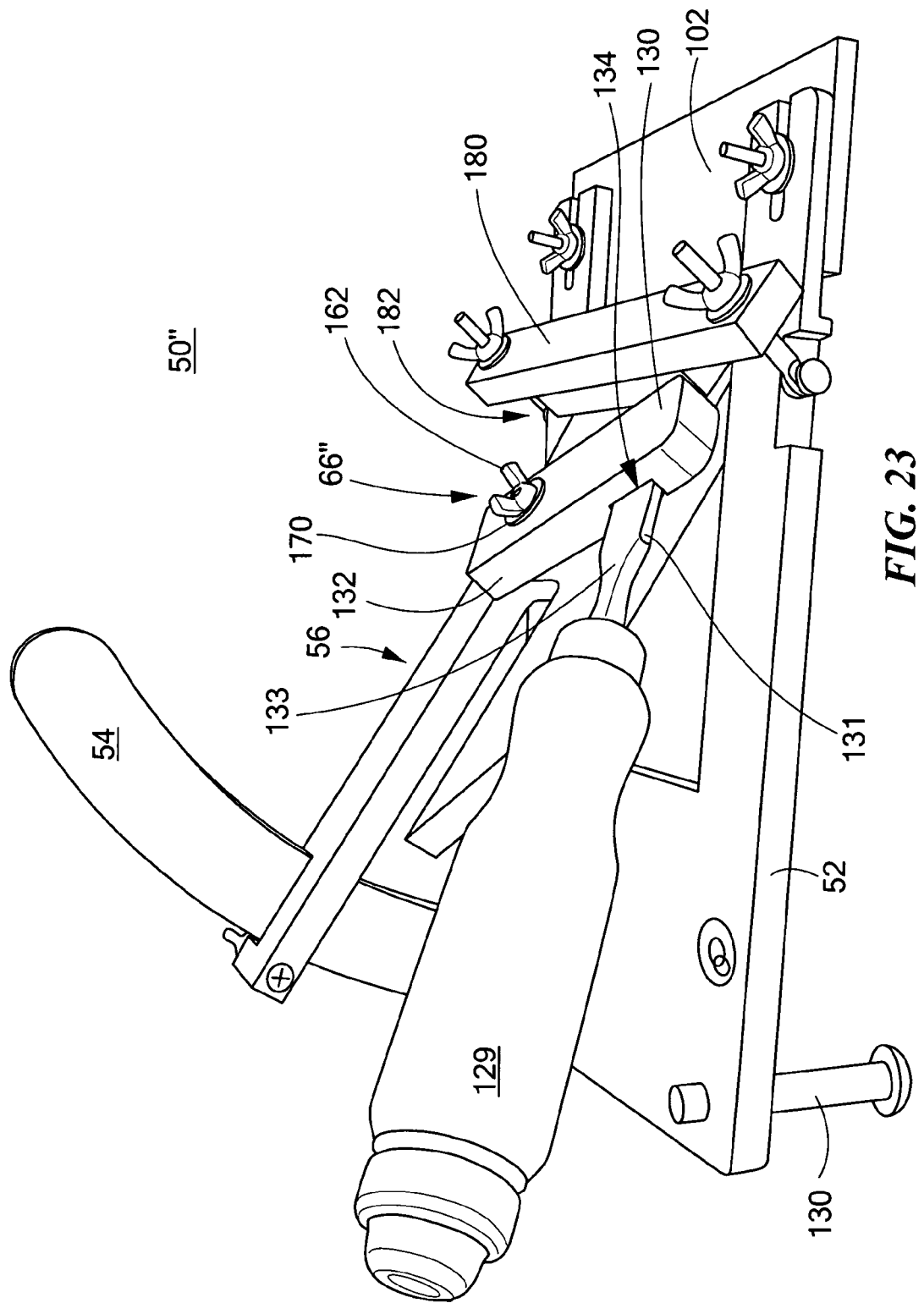
FIG. 23 is a three-dimensional side-view showing another embodiment of the universal sharpening jig of this invention used to sharpen a skew chisel.
Figure 24:
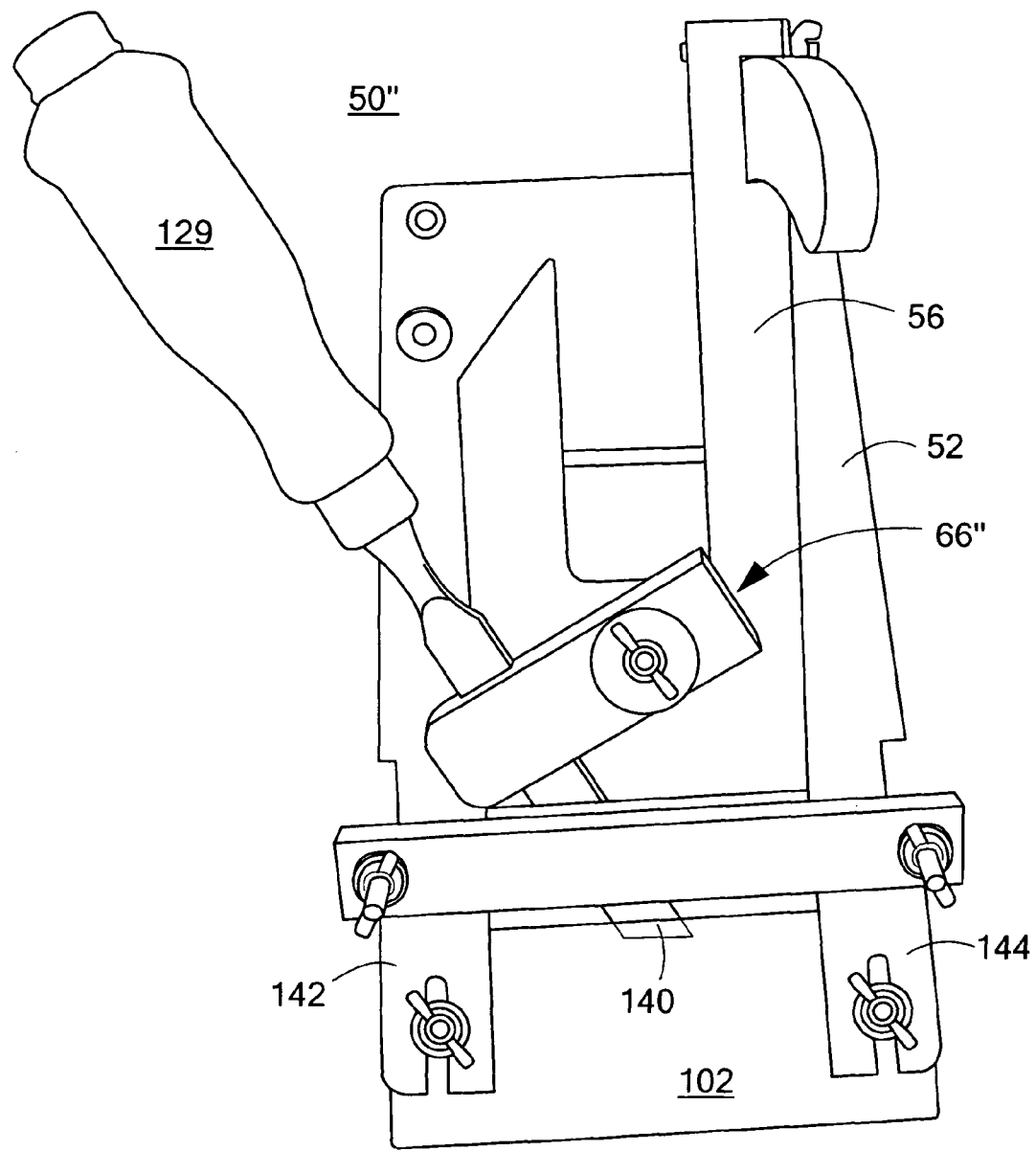
FIG. 24 is a three-dimensional front top-view of the universal sharpening jig shown in 23.
Figure 25:
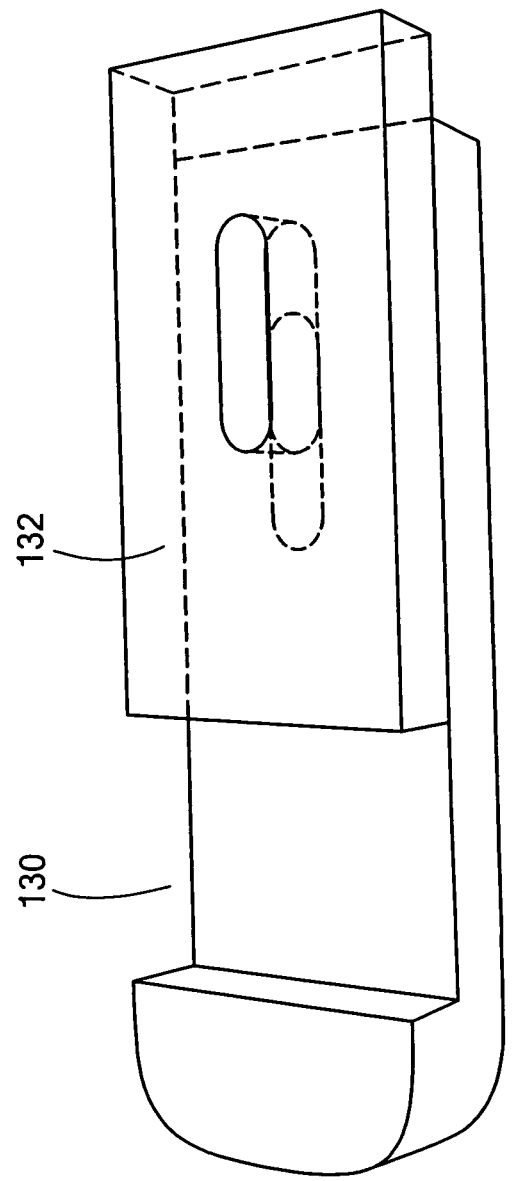
FIG. 25 is a three-dimensional side-view showing in further detail the structure of the slideable members shown in FIGS. 23 and 24.
Figure 26:
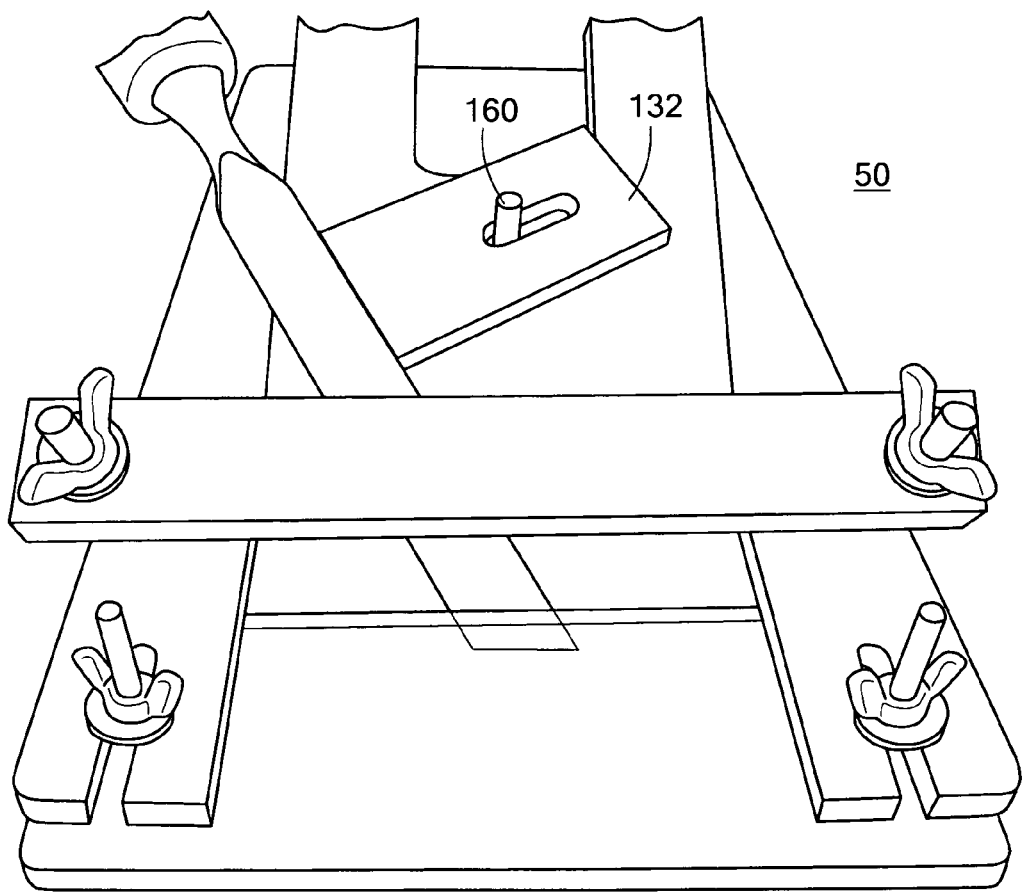
FIG. 26 is a three-dimensional front-view showing in further detail one of the slideable members shown in FIGS. 23 and 24 in place on the incline plate.

Although as discussed above, universal sharpening jig 50 with clamping device 66 may be used to secure a cutting blade, such as a hand plane iron or chisel to incline plate 56, in other examples, universal sharpening jig 50", FIG. 23, where like parts have been given like numbers, including clamping device 66" which may be used to attach blade 131 of skew chisel 129 to incline plate 56. In this design, clamping device 66" includes two slideable cooperating members 130 and 132 configured to define adjustable opening 134 for receiving skew chisel 129 having blades of various widths. Clamping device 66" is also configured to set the angle of skew chisel 129 such that cutting edge 140, FIG. 24, having a bevel, e.g., similar to bevel 76', FIG. 11, of skew chisel 129, is perpendicular to sides 142, 144, FIG. 24, of base plate 52 as shown. Incline plate 56, FIGS. 23 and 24, is configured to set and fix the angle of the incline plate with respect to base plate 52 to define a sharpening angle of all or a portion of the bevel with respect to flat back 133, FIG. 23, of skew chisel 129. FIG. 25 shows in further detail one example of slideable cooperating members 130 and 132. FIG. 26 shows in further detail one example of slideable member 132 in place about fastening device 160, e.g., a screw, such that clamping device 66", FIGS. 23 and 24, can be pivotably attached to incline plate 56. Preferably, clamping device 66" also includes nut 162, FIG. 23, and optional washer 170 which pivotably attach slideable members 130 and 132 to incline plate 56 to secure skew chisel 129 to incline plate 56. Push plate 102, FIGS. 23 and 24, may also assist in securing blade 131 of chisel 129 to include plate 56, e.g., as discussed above with reference to at least FIG. 7.

In one design, clamping device 66", FIG. 23, preferably includes bridge clamp 180 pivotably attached to base plate 52, e.g., by fasteners 182, configured to further secure skew chisel 129 to incline plate 56. Bridge clamp 180 is preferably attached to hinge ends 182 allowing it to span greater than incline width, and rotate so it parallels the upper surface of the tool.

Figure 27:
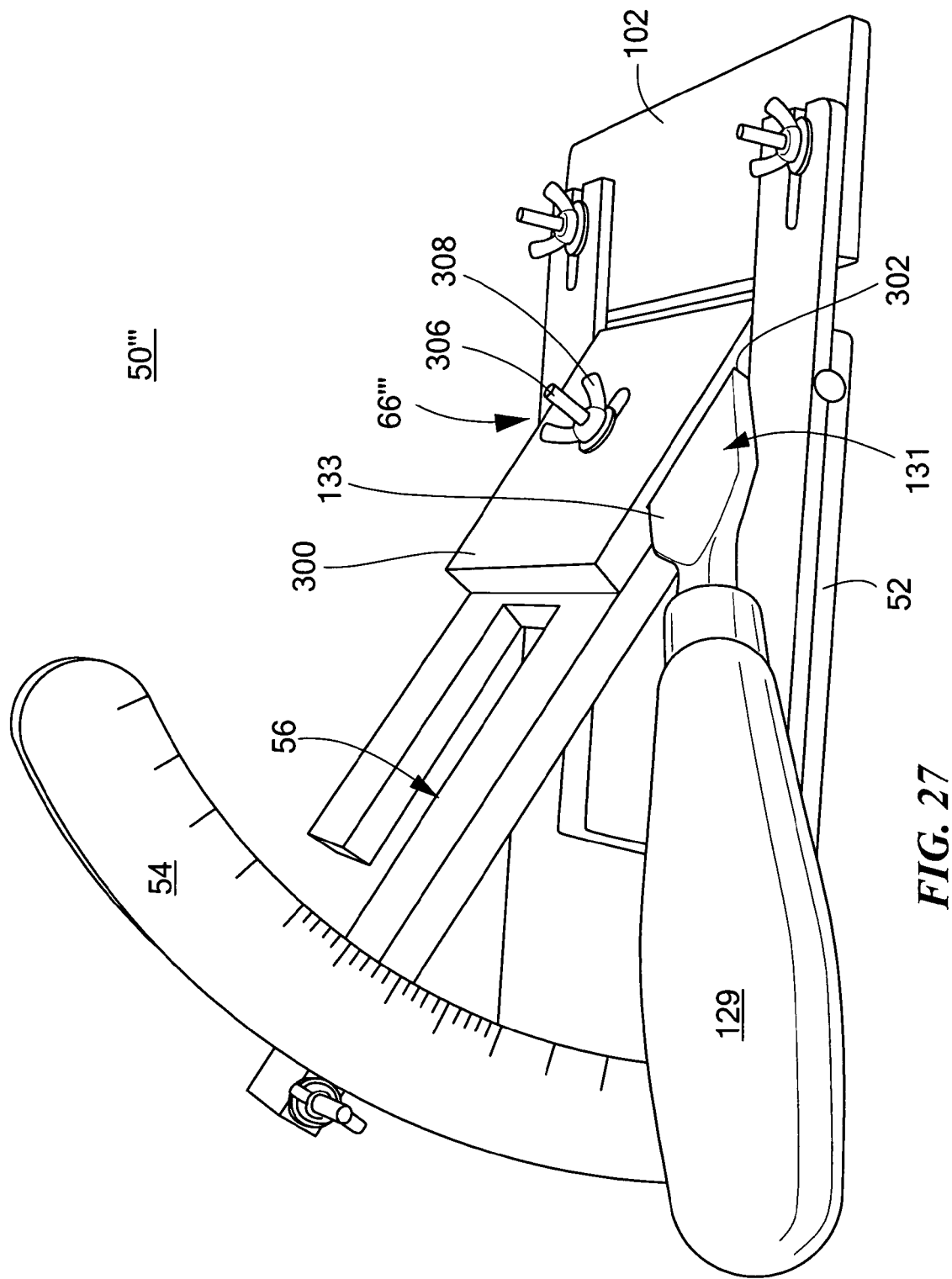
FIG. 27 is a three-dimensional side-view showing another embodiment of the universal sharpening jig of this invention which may be used to sharpen a skew chisel.
Figure 28:
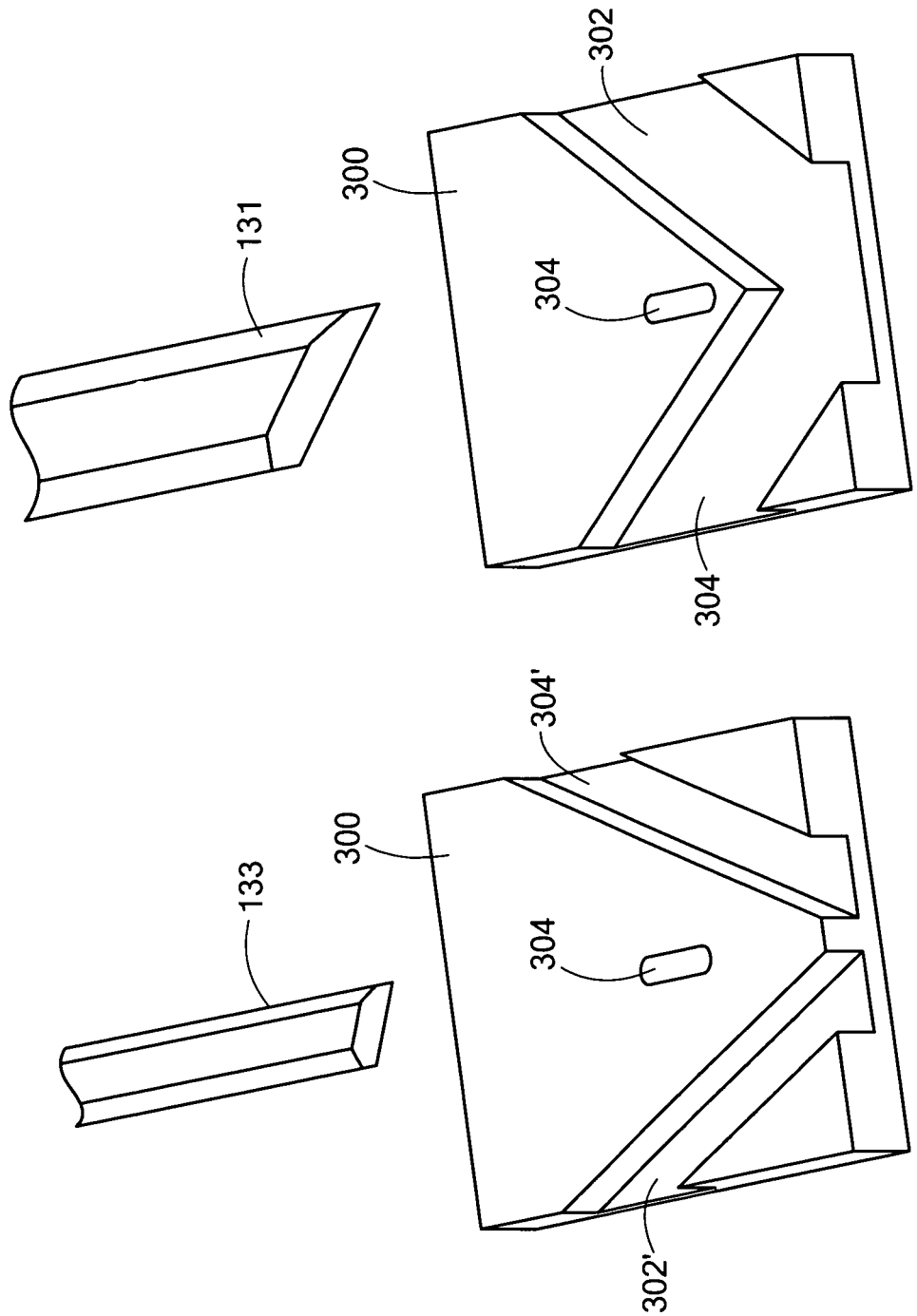
FIG. 28 are three-dimensional bottom-front views showing in further detail one example of the clamping device shown in FIG. 27.

Although, as discussed above with reference to FIGS. 23-26, universal sharpening jig 50' with clamping device 66" may be used to attach blade 131 of skew chisel 129 to incline plate 56, in another example, universal sharpening jig 50''', FIG. 27, where like parts have been given like numbers, may be used to attach blade 131 of skew chisel 129 to incline plate 56. In this example, clamping device 66''' includes recess plate 300 with at least channel 302 therein configured to receive blade 131 of skew chisel 129. FIG. 28 shows in further detail one embodiment of channel 302 for right-handed use. Channel 302 preferably accommodates skew chisel 129 having a blade width of about 1½". Securing plate 300 may also include channel 304 configured to receive blade 131 for left-handed use. In other examples, recess plate 300 may include channel 302', and/or channel 304' which is designed to accommodate smaller blade 133 of a skew chisel, e.g., in the range of 1" to 1½".

Figure 29:
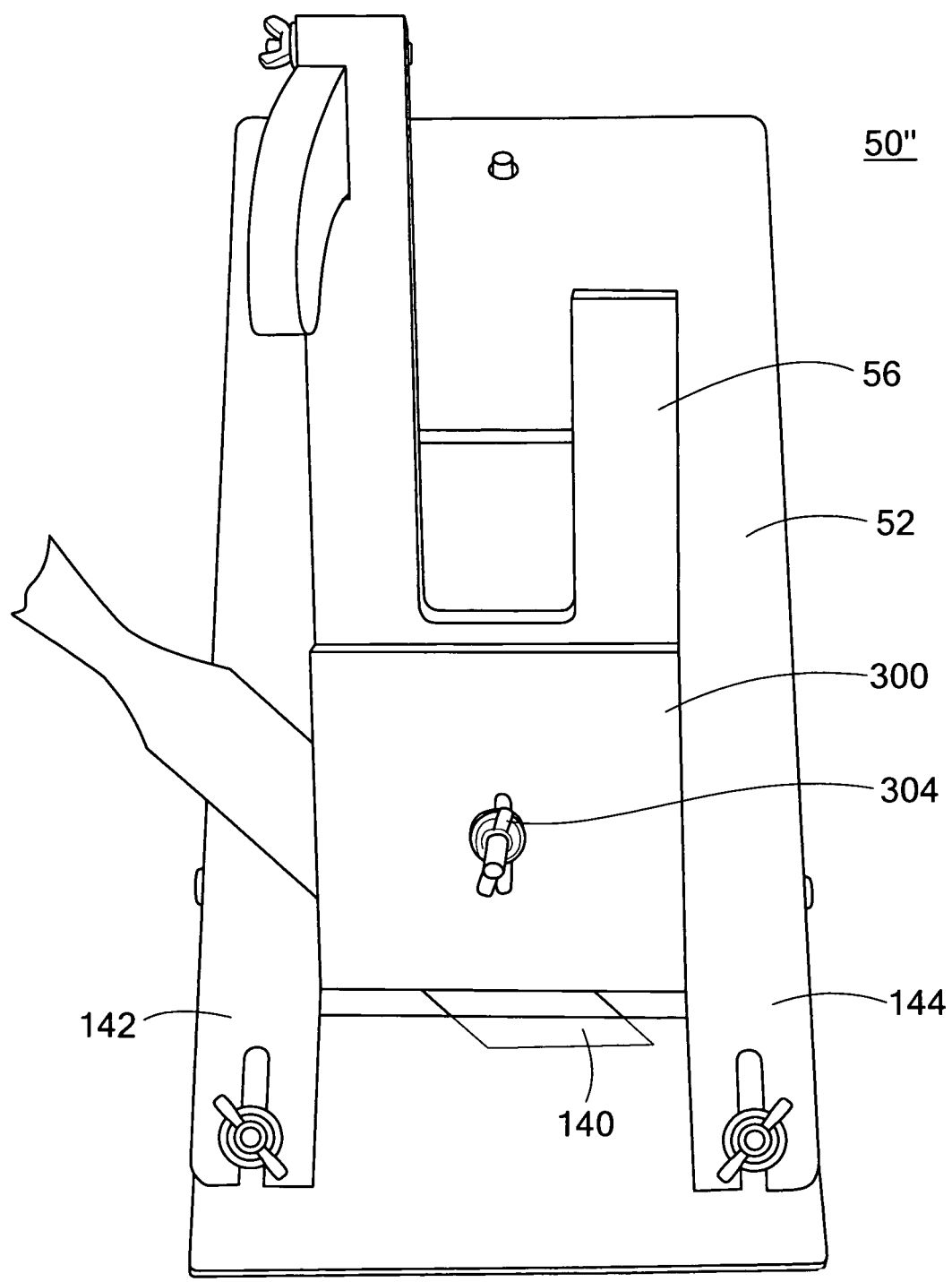
FIG. 29 is a three-dimensional front top-view of the universal sharpening jig shown in FIG. 27.

Recess plate 300 also includes opening 304 configured to receive bolt 306, FIG. 27, which extends through incline plate 56 and plate 300 as shown. Nut 308 attaches to screw 306 to secure securing plate 300 and blade 131 in channel 302 to incline plate 56. Channels 302, 304, FIG. 28, preferably set the angle of skew chisel 129 such that cutting edge 140, FIG. 29 is perpendicular to sides 142, 144 of base plate 52 as shown. Similar as discussed above, incline plate 56 is configured to set and fix the angle of incline plate with respect to base plate 52 to define a sharpening angle of all or a portion of the bevel with respect to flat back 133, FIG. 27, of skew chisel 129.

Figure 30:
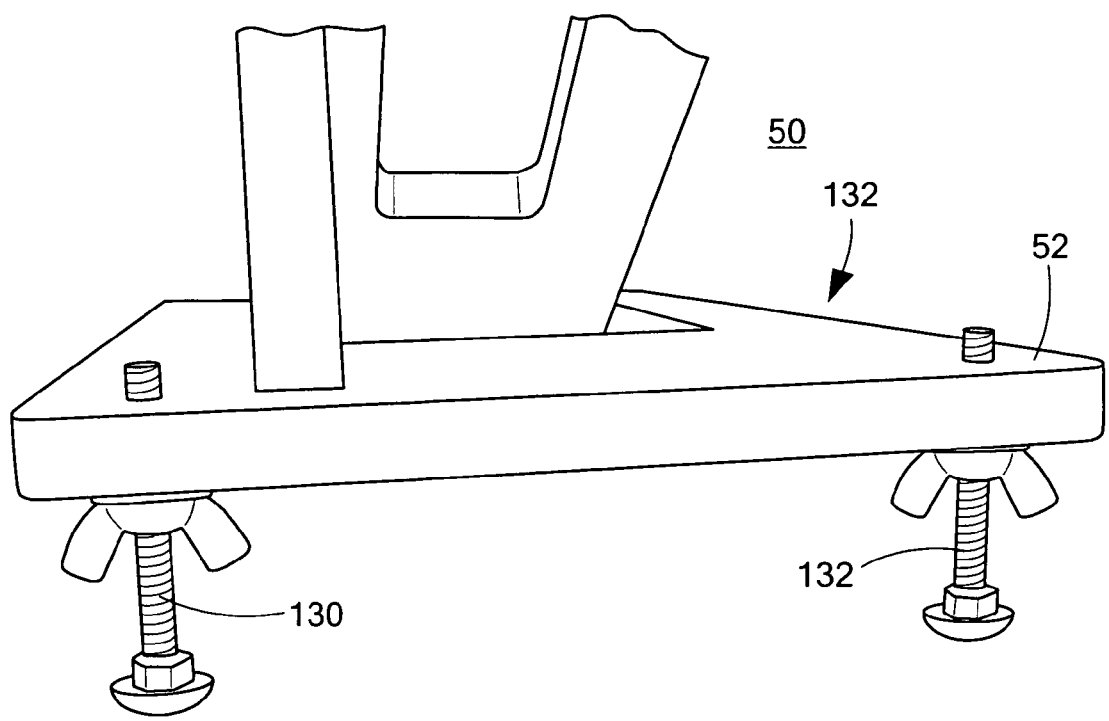
FIG. 30 is a three-dimensional back-view showing one example of spaced guides located at the back of the universal sharpening jig shown in one or more of FIGS. 7-29.
Figure 31:
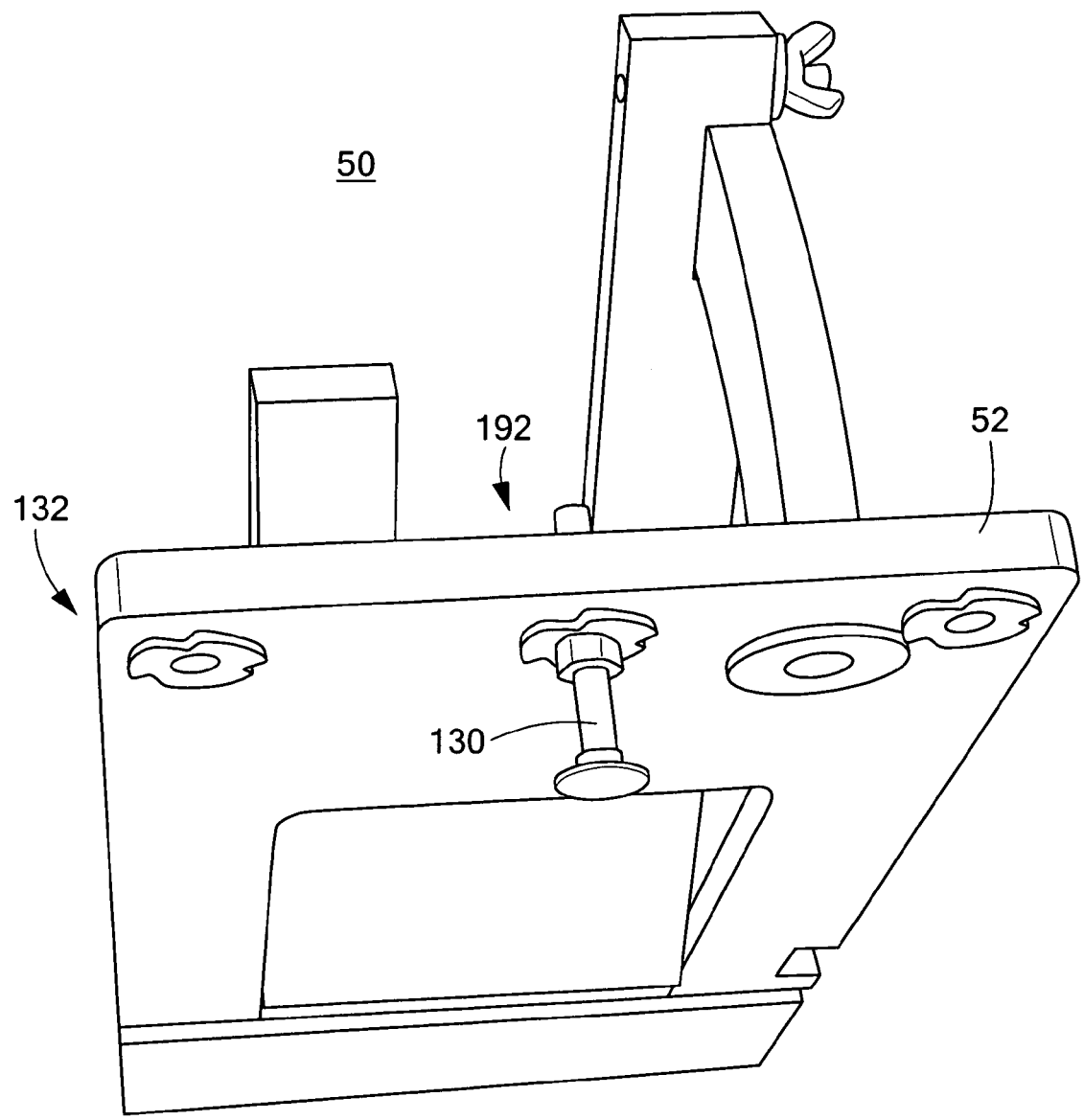
FIG. 31 is a three-dimensional back-view showing another example of a single glide located at approximately the back center of the sharpening jig shown in one or more of FIGS. 7-29.

Preferably, the at least one glide 130, shown in one or more of FIGS. 7-29 may include a plurality of glides 130, 132, FIG. 30, spaced as shown on base plate 52 proximate back 132 of base plate 52. Preferably glides 130, 132 are spaced a width greater than the width of the cutting blade to provide increased sharpening control. In other examples, only one glide, e.g., glide, 130, FIG. 31, may be placed proximate back 132 of base plate 52 and at approximately at center 192 of base plate 52. Preferably, at least one glides 130, 132 include a rounded surface as shown.

Any azimuth orientation of the cutting edge on cutting blade 64 on the abrasive surface may be used to stroke is provided by semi-spherical shape of the glides combined with low load on the glides due far rear location of glides which reduces frictional drag. The glides enable straight edges when the abrasive surface is flat or crowned edges when the abrasive surface has a large radius that is concave with low skill. See the '316 patent cited supra.

The various positions of the glides on the base plate provide for moving the cutting blade fixed to the incline plate of universal sharpening jig 50 at the desired sharpening angle in any desired direction on the abrasive surface to effectively and efficiently sharpen the bevel of the cutting blade with respect to the back plate while using the entire surface area of the abrasive surface without damaging the abrasive surface in any way.

Figure 32:
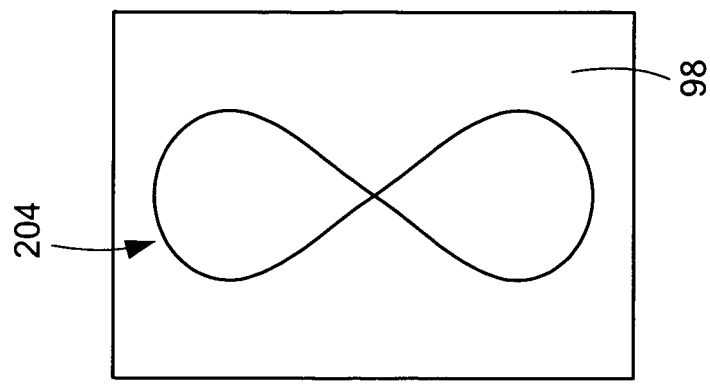
FIGS. 32-35 depict various examples of the stroking pattern that may be used with the one or more embodiments of the universal sharpening jig shown in one or more of FIGS. 7-31.
Figure 32:
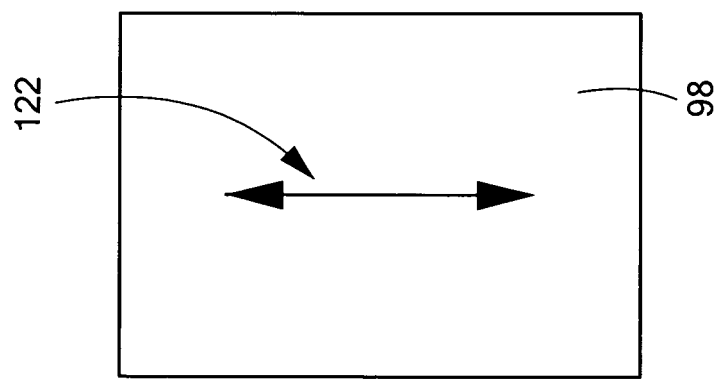
Figure 32:
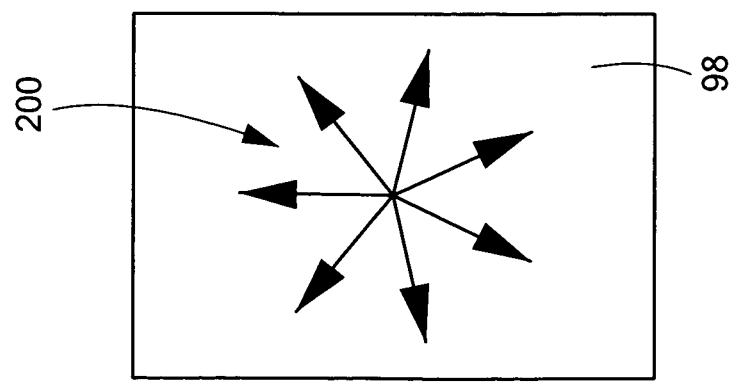
Figure 33:
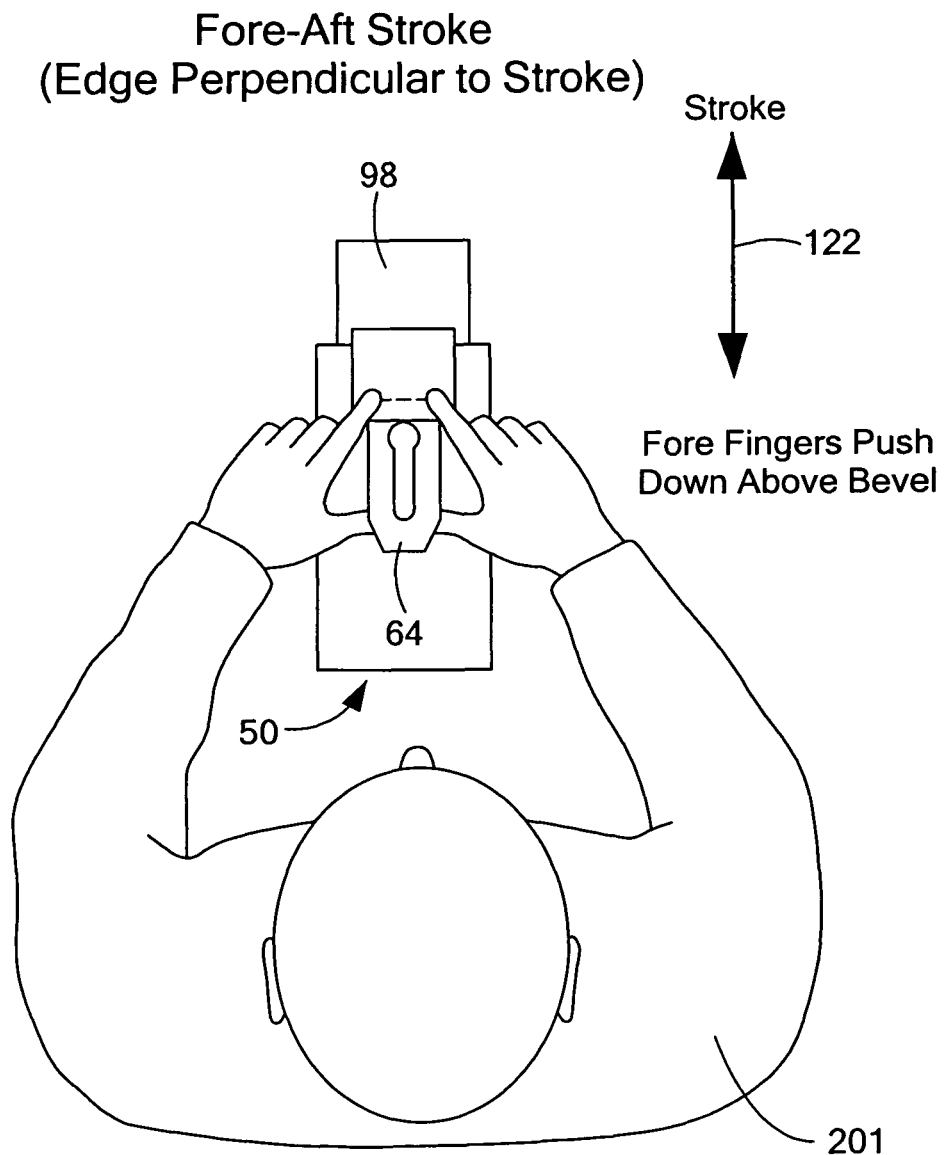

For example, universal sharpening jig 50, shown in one or more of FIGS. 7-31, may be moved in any direction on abrasive surface 98, FIG. 32, indicated at 200, fore-and-aft on abrasive surface 98, indicated at 122, FIGS. 10, 11, and 32, in or in a figure eight lapping motion, indicated at 202, FIG. 32, to abrade the bevel of the cutting blade causing a sharper intersection between the bevel and the flat back of the cutting blade. FIG. 33 shows an example of user 201 stroking universal sharpening jig 50 with cutting blade 64 secured thereto in fore-and-aft direction 122 on abrasive surface 98.

Figure 34:
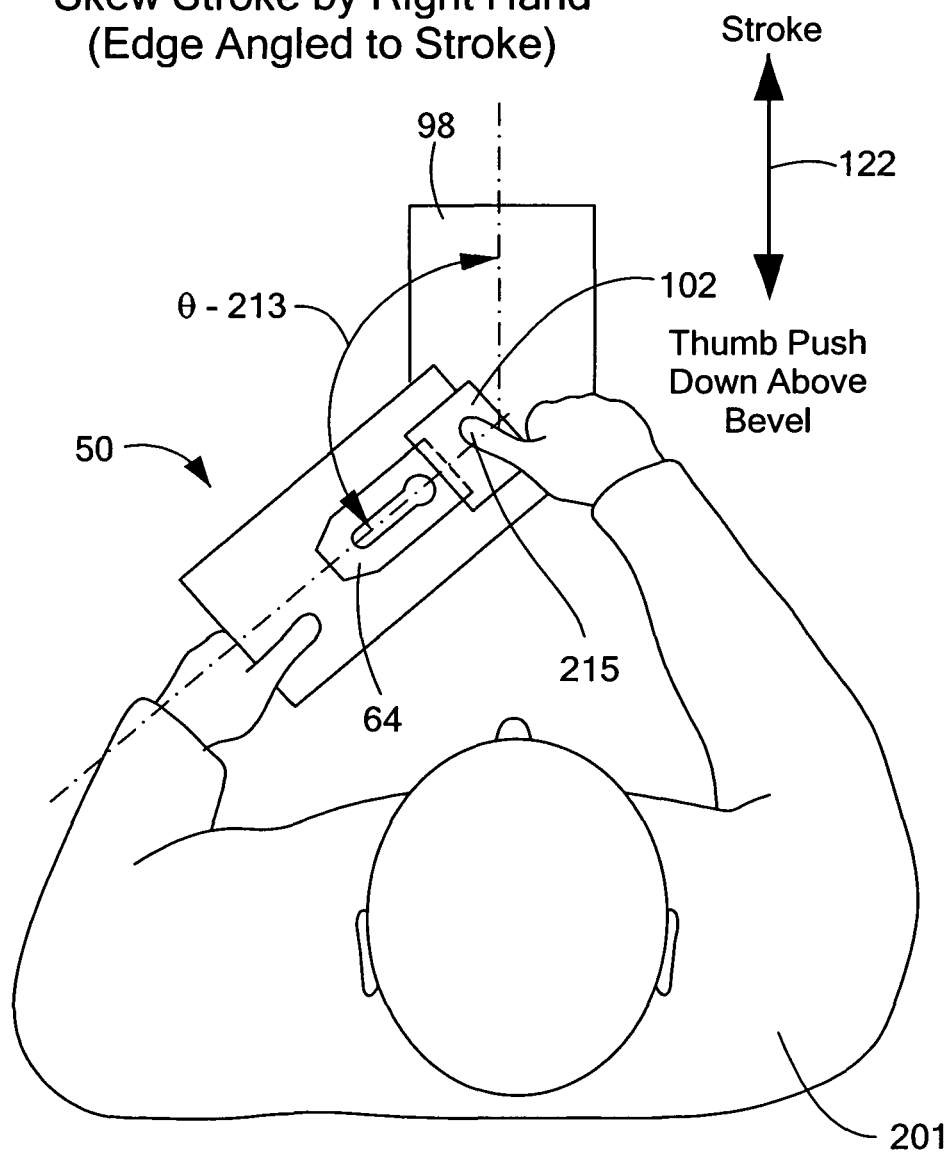
Figure 35:
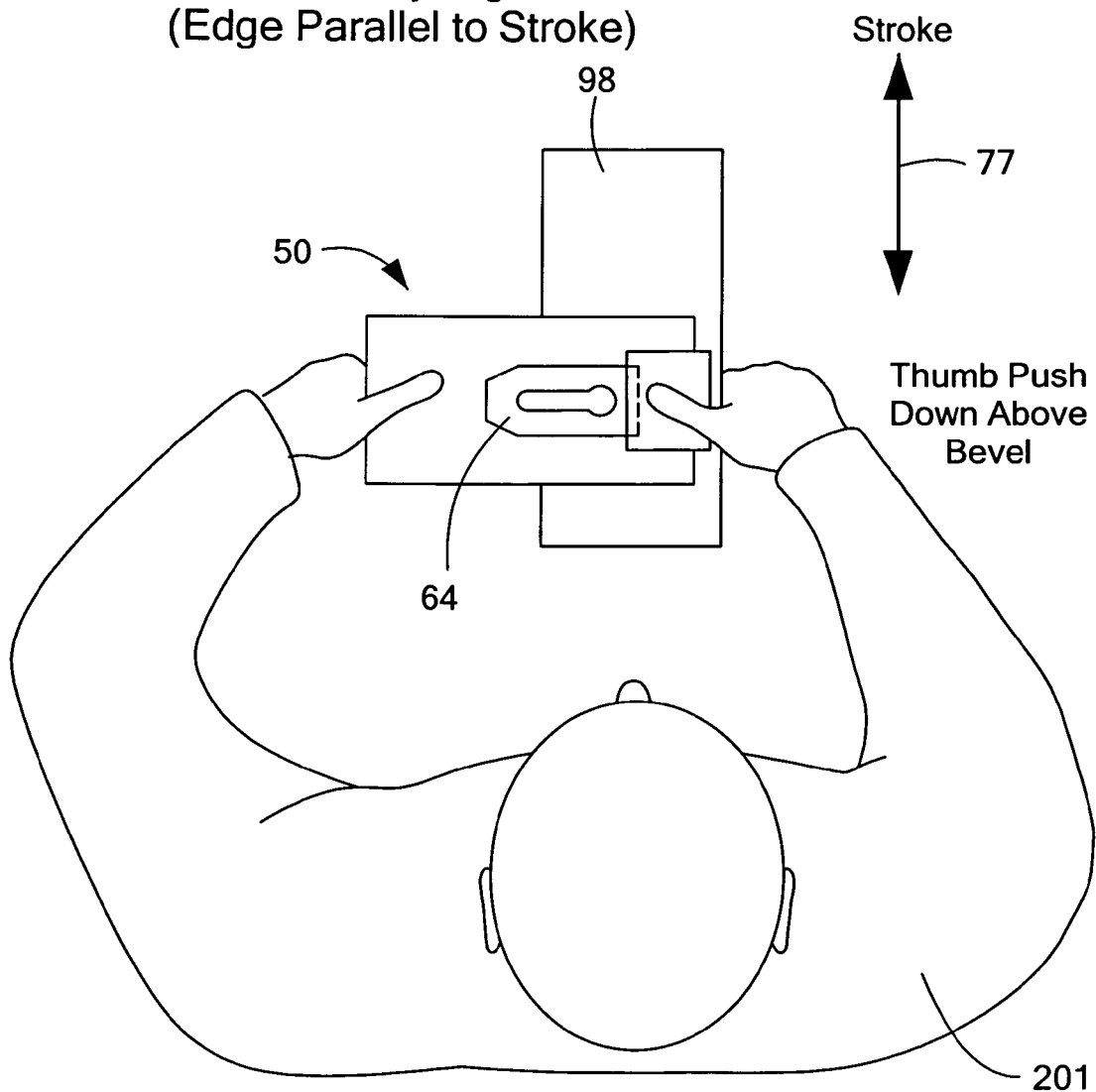
Figure 36:
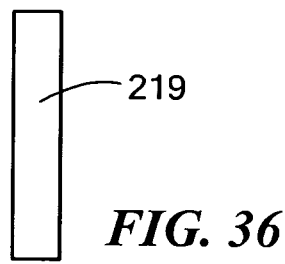
FIG. 36 is a schematic top-view of a half-width abrasive surface.

Universal sharpening jig 50 with cutting blade 64 secured thereto may also be used in a skew stroke manner as shown in FIG. 34. In this example, user 201 places universal sharpening jig 50 with cutting blade 64 secured thereto at a skew angle θ-213 as shown and strokes in fore-and-aft direction 122 as shown. Preferably, thumb or finger 215 of user 201 pushes down on push plate 102 above the bevel of cutting blade 64 as shown and discussed above. In other examples, universal sharpening jig 50 may be moved in a side-stroke manner direction 77, FIGS. 8, 18, 19 on abrasive surface 98, e.g., as shown in FIG. 35. In this example, universal sharpening jig 50 is placed perpendicular to abrasive surface 98 as shown and user 201 strokes side stroke direction 77 to sharpen the intersection between the bevel and flat back of bevel of abrasive surface of cutting blade 64. Although in this example, universal sharpening jig 50 is a side-stroked on a full width abrasive surface 98 as shown, in other examples, universal sharpening jig 50 may be side-stroked of a half width abrasive surface 98, e.g., half width abrasive surface 219, FIG. 36, to sharpen the bevel of the cutting blade with respect to the flat back. As known by those skilled in the art, full width abrasive surface 98, FIG. 35, typically has a width of about 3" to 3½" width and abrasive surface 219, FIG. 35, typically has a width of about 1" to about 1½".

Incline plate 56 and protractor plate 54 shown in one or more of FIGS. 7-29 may be configured to directly set and fix the sharpening angle of all or a portion of the bevel with respect to the flat back to create a sharpened edge, e.g., a hone bevel, e.g., about a 30° sharpening angle, a honed and polished micro bevel, e.g., about a 31° angle, or a honed and polished back bevel.

The result is universal sharpening jig 50 of one or more embodiments of this invention effectively and efficiently provides for abrading the bevel of hand plane irons, skew irons, chisels, skew chisels, and scraper irons while reducing destabilizing moments and the energy needed to sharpen the cutting blade. Such a design eliminates "white knuckle" gripping, and provides more control to the user. The unique design of universal sharpening jig 50 with at least one glide located proximate the back of the base plate allows universal sharpening jig to use the entire surface area of the abrasive surface without damaging it beyond normal abrasive wear. Universal sharpening jig 50 also accurately and effectively sets the sharpening angle of the cutting blade by longitudinally and laterally leveling the base plate with respect to the abrasive surface with the unique all azimuth level.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A universal sharpening jig for a cutting blade comprising:
   a base plate;
   a protractor plate coupled to the base plate;
   an incline plate hingedly coupled to the base plate and slideably connected to the protractor plate, the incline plate configured to secure the cutting blade and configured to set and fix the angle of the incline plate with respect to the base plate to define a sharpening angle of all or a portion of a bevel with respect to a flat back of the cutting blade;
   a push plate slideably attached proximate a front of the base plate and co-planar with a bottom surface of the base plate, the push plate configured to position a user-applied force vector thereon and directly apply the force vector closely proximate the intersection of the bevel and an abrasive surface to reduce de-stabilizing moments and user energy need to create a sharpened edge between the bevel and the flat back of the cutting blade; and
   at least one glide located proximate back of the base plate configured to longitudinally and/or laterally level the base plate with respect to a level abrasive surface to allow movement of the jig in all horizontal directions by a user to create the sharpened edge on the cutting blade.

2. The universal sharpening jig of claim 1 in which the cutting blade includes one or more of: a hand plane iron, a skew plane iron, a chisel, a skew chisel, and a scraper plane iron.

3. The universal sharpening jig of claim 1 in which the clamping device is configured to secure the cutting blade having an edge tool width in the range of about one-quarter inch to about three inches.

4. The universal sharpening jig of claim 2 in which the incline plate further includes a clamping device configured to secure the cutting blade to the incline plate.

5. The universal sharpening jig of claim 1 further including a bridge clamp privotably attached to the base plate configured to further secure the cutting blade in place.

6. The universal sharpening jig of claim 4 in which the clamping device includes a securing plate attached to the incline plate configured to secure the cutting blade to the incline plate and provide for longitudinally adjusting the position of the cutting blade with respect to the abrasive surface.

7. The universal sharpening jig of claim 4 in which the clamping device includes two slideable cooperating members pivotably attached to the incline plate configured to define an adjustable opening for receiving a blade of the skew chisel and configured to set the angle of the blade of the skew chisel such that the cutting edge of the blade is perpendicular to the sides of the base plate.

8. The universal sharpening jig of claim 7 further including a bridge clamp pivotably attached to the base plate configured to further secure the blade of the skew chisel in place.

9. The universal sharpening jig of claim 4 in which the clamping device includes a recess plate having one or more channels therein configured to receive a blade of a skew chisel.

10. The universal sharpening jig of claim 8 in which the one or more channels are each configured at a predetermined angle such that a cutting surface of the blade of the skew chisel is perpendicular to sides of the base plate.

11. The universal sharpening jig of claim 10 further including a bridge clamp pivotably attached to the base plate configured to further secure the cutting blade in place.

12. The universal sharpening jig of claim 4 in which the clamping device plate is configured to secure the bevel of the cutting blade in a bevel down configuration.

13. The universal sharpening jig of claim 1 in which the incline plate and the protractor plate are configured to create a bevel having an angle in the range of about 5° to about 60° with respect to the flat back.

14. The universal sharpening jig of claim 1 in which the incline plate and the protractor plate are configured to directly set and fix the sharpening angle to create a hone bevel on the cutting blade.

15. The universal sharpening jig of claim 1 in which the incline plate and the protractor plate are configured to directly set and fix the sharpening of the angle to create a micro bevel on the cutting blade.

16. The universal sharpening jig of claim 1 in which the incline plate and the protractor plate are configured to directly set and fix the sharpening of the angle to create a back bevel on the cutting blade.

17. The universal sharpening jig of claim 1 in which the incline plate and the protractor plate are configured to compensate for a tapered cutting blade.

18. The universal sharpening jig of claim 1 in which the at least one glide includes a plurality of glides configured to increase sharpening control.

19. The universal sharpening jig of claim 18 in which the plurality of glides is spaced a width greater than the width of the cutting blade to provide increased sharpening control.

20. The universal sharpening jig of claim 1 in which the at least one glide includes a rounded surface.

21. The universal sharpening jig of claim 1 in which the push plate includes one or more recesses configured to position the user-applied force vector more closely proximate the intersection of the bevel and the abrasive surface to further reduce the destabilizing moments and user energy needed to create the sharpened edge.

22. The universal sharpening jig of claim 1 in which the push plate is positioned proximate the cutting blade to further secure the cutting blade to the incline plate.

23. The universal sharpening jig of claim 1 in which the push plate is made of a transparent material for viewing one or more of swarf, the cutting blade, the abrasive surface, and the sharpened edge.

24. The universal sharpening jig of claim 1 in which the push plate includes stepped plate configured to provide for sharpening a back bevel.

25. The universal sharpening jig of claim 1 in which the at least one glide provides for stroking the jig over the abrasive surface in all horizontal directions.

26. The universal sharpening jig of claim 1 in which the at least one glide provides for stroking the jig over the abrasive surface in the jig longitudinally fore-and-aft.

27. The universal sharpening jig of claim 1 in which the glide provides for side-stroking the jig over the abrasive surface.

28. The universal sharpening jig of claim 1 in which the sharpening jig is configured to provide for side-stroking the jig over the abrasive surface to create a crowned bevel.

29. The universal sharpening jig of claim 1 in which the at least one glide is configured to provide for stroking the jig with a skew stroke over a full width abrasive surface.

30. The universal sharpening jig of claim 1 in which the at least one glide is configured to provide for stroking the jig with a skew stroke over a half width abrasive surface.

31. The universal sharpening jig of claim 1 in which the at least one glide is configured to provide for stroking the jig over the abrasive surface in a figure eight lapping pattern.

32. The universal sharpening jig of claim 1 in which the at least one glide is configured to enable the jig to use the entire surface area of the abrasive surface.

33. The universal sharpening jig of claim 1 in which the at least one glide is configured to provide for side-stroking the jig over a full width abrasive surface.

34. The universal sharpening jig of claim 1 in which the at least one glide is configured to provide for side-stroking the jig over a half width abrasive surface.

35. A universal sharpening jig for a cutting blade comprising:
   a base plate;
   a protractor plate coupled to the base plate;
   an incline plate hingedly coupled to the base plate and slideably connected to the protractor plate, the incline plate configured to secure the cutting blade and configured to set and fix the angle of the incline plate with respect to the base plate to define a sharpening angle of all or a portion of a bevel with respect to a flat back of the cutting blade;
   an all azimuth spirit level in the base plate configured to determine if the base plate is longitudinally and laterally level with respect to a leveled abrasive surface located on a level work surface;
   a push plate slideably attached proximate a front of the base plate and co-planar with a bottom surface of the base plate, the push plate configured to position a user-applied force vector thereon and directly apply the force vector above and closely proximate the intersection of the bevel and an abrasive surface to reduce de-stabilizing moments and user energy needed to create the sharpened edge on the cutting blade; and
   at least one glide located proximate back of the base plate and in contact with a work surface of a bench configured to longitudinally and/or laterally level the base plate with respect to the abrasive surface to allow movement of the jig in all horizontal directions by a user to create the sharpened edge on the cutting blade.

* * * * *